(12) United States Patent
Huang et al.

(10) Patent No.: US 10,068,033 B2
(45) Date of Patent: Sep. 4, 2018

(54) GRAPH DATA QUERY METHOD AND APPARATUS

(71) Applicant: Huawei Technologies Co., Ltd., Shenzhen, Guangdong (CN)

(72) Inventors: Guowei Huang, Shenzhen (CN); Youliang Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 15/196,802

(22) Filed: Jun. 29, 2016

(65) Prior Publication Data

US 2016/0306897 A1    Oct. 20, 2016

Related U.S. Application Data

(63) Continuation of application No. PCT/CN2013/090926, filed on Dec. 30, 2013.

(51) Int. Cl.
*G06F 17/30* (2006.01)

(52) U.S. Cl.
CPC .. *G06F 17/30958* (2013.01); *G06F 17/30486* (2013.01)

(58) Field of Classification Search
CPC .............. G06F 17/30958; G06F 17/30486
USPC ............................................. 707/736
See application file for complete search history.

(56) References Cited

U.S. PATENT DOCUMENTS

| 2012/0310916 A1 | 12/2012 | Abadi et al. |
| 2013/0124488 A1 | 5/2013 | Kang et al. |
| 2013/0239100 A1 | 9/2013 | Andrade et al. |
| 2014/0040267 A1 | 2/2014 | Yamane et al. |

FOREIGN PATENT DOCUMENTS

| CN | 101620606 A | 1/2010 |
| CN | 102163218 A | 8/2011 |
| CN | 102662974 A | 9/2012 |
| CN | 102999542 A | 3/2013 |
| CN | 103399902 A | 11/2013 |
| JP | 2009258794 A | 11/2009 |
| JP | 2012198873 A | 10/2012 |

*Primary Examiner* — Joshua Bullock

(57) ABSTRACT

A graph data query method and apparatus are disclosed, where the method includes: acquiring a partition number and a layer number of a query vertex; determining, based on the partition number and the layer number of the query vertex, a partition number and a layer number of a candidate vertex indicated by a query condition, and using the partition number and the layer number of the candidate vertex respectively as a candidate partition number and a candidate layer number; forming a candidate set using a vertex whose partition number and layer number satisfy any group of a candidate partition number and a candidate layer number; and performing graph data query in the candidate set according to the query condition.

20 Claims, 6 Drawing Sheets

GRAPH DATA QUERY METHOD AND APPARATUS

CROSS-REFERENCE TO RELATED APPLICATIONS

This application is a continuation of International Application No. PCT/CN2013/090926, filed on Dec. 30, 2013, which is hereby incorporated by reference in its entirety.

TECHNICAL FIELD

The present invention relates to graph data query technologies in the field of data processing technologies, and in particular, to a graph data query method and apparatus.

BACKGROUND

With rapid development of a social network, the World Wide Web, a telecommunications network, and the like, organization and query technologies based on graph data have emerged. When a data volume is relatively large, graph data may also be referred to as big graph data.

A set of graph data may be referred to as a graph data whole set, where the graph data whole set generally includes multiple vertices and an edge between every two vertices that have a connection relationship. According to an actual application scenario, a vertex may represent a corresponding physical meaning. For example, in a social network, a vertex represents a user; graph data of a vertex may include various attribute data of a user represented by the vertex, such as a name, a gender, an age, a friend list, and the like; for two vertices that have a connection relationship, an edge is created between the two vertices, and the edge may indicate that users represented by the two vertices are friends. For another example, in a map, a vertex may represent a geographical location; graph data of a vertex may include various attribute data of a geographical location represented by the vertex, such as a location name, location coordinates, and the like; for two vertices that have a connection relationship, an edge is created between the two vertices, and the edge may indicate that there is a direct path between geographical locations represented by the two vertices, that is, one vertex may be connected from the other vertex without passing through another vertex.

In actual application of graph data, the graph data often needs to be queried to acquire expected graph data. For example, in a social network, related graph data of a specified user may be queried, or a user that has a friend relationship with a specified user may be queried according to a query condition. For another example, in a map, a shortest path between two geographical locations may be queried.

However, as a data volume of a graph data whole set grows, query efficiency decreases because each graph data query is based on all graph data included in the graph data whole set.

To improve query efficiency, some solutions to organizing graph data have emerged in the prior art. In these solutions, a partitioning algorithm is generally used to organize graph data, that is, all graph data in a graph data whole set is divided into multiple partitions for separate storage and calculation.

However, even though partitioning is performed on graph data, for some query requirements, for example, a distance related query requirement, query still needs to be performed based on a graph data whole set, so as to ensure accuracy of a query result. In this case, a problem of relatively low query efficiency still exists.

SUMMARY

Embodiments of the present invention provide a graph data query method and apparatus, so as to resolve a problem in the prior art that graph data query efficiency is relatively low.

According to a first aspect, a graph data query method is provided, which is applied to query of graph data in a graph data whole set, where the graph data whole set includes multiple vertices and an edge between every two vertices that have a connection relationship; partitioning and layering are performed in advance on the multiple vertices in the graph data whole set; a number of a partition in which a vertex is located is used as a partition number of the vertex; a shortest distance between a vertex and a partition border of a partition in which the vertex is located is used as a layer number of the vertex; and the method includes:

acquiring a query condition, and a partition number and a layer number of a query vertex indicated by the query condition;

determining, based on the partition number and the layer number of the query vertex, a partition number and a layer number of a candidate vertex indicated by the query condition, and using the partition number and the layer number of the candidate vertex respectively as a candidate partition number and a candidate layer number, where the candidate vertex is a vertex that needs to be queried according to the query condition;

forming a candidate set using a vertex whose partition number and layer number satisfy the candidate partition number and the candidate layer number respectively; and performing graph data query in the candidate set according to the query condition.

With reference to the first aspect, in a first possible implementation manner, a layer number of a vertex incapable of reaching a partition border of a partition in which the vertex is located is a default layer number, and the default layer number is different from a layer number of a vertex capable of reaching a partition border of a partition in which the vertex is located; and before the determining a partition number and a layer number of a candidate vertex indicated by the query condition, the method further includes:

determining whether the layer number of the query vertex is the default layer number; and when a result of the determining is that the layer number of the query vertex is not the default layer number, triggering the step of determining a partition number and a layer number of a candidate vertex indicated by the query condition; or the method further includes:

when the layer number of the query vertex is the default layer number, forming a candidate set using a vertex whose partition number is the partition number of the query vertex and whose layer number is the default layer number; and performing graph data query in the candidate set according to the query condition.

With reference to the first aspect, in a second possible implementation manner, for the edge between every two vertices that have a connection relationship, when all of the edges have a same weight or when none of the edges has a weight, a shortest distance between a vertex and a partition border of a partition in which the vertex is located is a smallest hop count between the vertex and the partition border of the partition in which the vertex is located, and a distance between two vertices is a hop count between one vertex of the two vertices and the other vertex; or for the edge between every two vertices that have a connection relationship, when not all of the edges have a same weight, a minimum length in lengths of paths between a vertex and a partition border of a partition in which the vertex is located is used as a shortest distance between the vertex and the partition border of the partition in which the vertex is located, and a distance between two vertices is a length of a path between one vertex of the two vertices and the other vertex, where a length of a path is the sum of weights of edges included in the path.

With reference to the first aspect, in a third possible implementation manner, the determining, based on the partition number and the layer number of the query vertex, a partition number and a layer number of a candidate vertex indicated by the query condition specifically includes:

determining, based on the partition number and the layer number of the query vertex and according to a distance between the candidate vertex indicated by the query condition and the query vertex, the partition number and the layer number of the candidate vertex.

With reference to the third possible implementation manner of the first aspect, in a fourth possible implementation manner, edge-cut partitioning is performed in advance on the multiple vertices in the graph data whole set; a partition border includes no vertex; and a shortest distance between a vertex that has an edge crossing another partition and a partition border of a partition in which the vertex is located is zero; and when the query condition indicates a maximum distance between the candidate vertex and the query vertex, the determining a partition number and a layer number of the candidate vertex specifically includes:

when the maximum distance is not greater than the layer number of the query vertex, determining that the partition number of the candidate vertex is the partition number of the query vertex; determining a minimum value between a maximum layer number in a partition in which the query vertex is located and a value obtained by adding the layer number of the query vertex and the maximum distance; and determining a layer number within a closed interval from a value obtained by subtracting the maximum distance from the layer number of the query vertex to the minimum value as the layer number of the candidate vertex; or when the maximum distance is greater than the layer number of the query vertex, determining that the partition number of the candidate vertex is the partition number of the query vertex and a partition number of a neighboring partition of a partition in which the query vertex is located; for the partition in which the query vertex is located, determining a minimum value between a maximum layer number in the partition in which the query vertex is located and a value obtained by adding the layer number of the query vertex and the maximum distance, and determining a layer number within a closed interval from zero to the minimum value as the layer number that is of the candidate vertex and that belongs to a same group as the partition number of the query vertex; and for each neighboring partition of the partition in which the query vertex is located, determining a minimum value between a maximum layer number of the neighboring partition and a value obtained by subtracting the layer number of the query vertex and then subtracting 1 from the maximum distance, and determining a layer number within a closed interval from zero to the minimum value as the layer number that is of the candidate vertex and that belongs to a same group as a partition number of the neighboring partition.

With reference to the third possible implementation manner of the first aspect, in a fifth possible implementation manner, vertex-cut partitioning is performed in advance on the multiple vertices in the graph data whole set; a partition border includes a vertex; and a shortest distance between the vertex on the partition border and the partition border of a partition in which the vertex is located is zero; and when the query condition indicates a maximum distance between the candidate vertex and the query vertex, the determining a partition number and a layer number of the candidate vertex specifically includes:

when the maximum distance is not greater than the layer number of the query vertex, determining that the partition number of the candidate vertex is the partition number of the query vertex; determining a minimum value between a maximum layer number in a partition in which the query vertex is located and a value obtained by adding the layer number of the query vertex and the maximum distance; and determining a layer number within a closed interval from a value obtained by subtracting the maximum distance from the layer number of the query vertex to the minimum value as the layer number of the candidate vertex; or when the maximum distance is greater than the layer number of the query vertex, determining that the partition number of the candidate vertex is the partition number of the query vertex and a partition number of a neighboring partition of a partition in which the query vertex is located; for the partition in which the query vertex is located, determining a minimum value between a maximum layer number in the partition in which the query vertex is located and a value obtained by adding the layer number of the query vertex and the maximum distance, and determining a layer number within a closed interval from zero to the minimum value as the layer number that is of the candidate vertex and that belongs to a same group as the partition number of the query vertex; and for each neighboring partition of the partition in which the query vertex is located, determining a minimum value between a maximum layer number of the neighboring partition and a value obtained by subtracting the layer number of the query vertex from the maximum distance, and determining a layer number within a closed interval from zero to the minimum value as the layer number that is of the candidate vertex and that belongs to a same group as a partition number of the neighboring partition.

With reference to the first aspect, in a sixth possible implementation manner, the acquiring a query condition, and a partition number and a layer number of a query vertex indicated by the query condition specifically includes:

acquiring the query condition; and when the query condition indicates that a shortest path between a first query vertex and a second query vertex needs to be queried, acquiring a partition number and a layer number of the first query vertex and a partition number and a layer number of the second query vertex; and the determining, based on the partition number and the layer number of the query vertex, a partition number and a layer number of a candidate vertex indicated by the query condition specifically includes:

when the first query vertex and the second query vertex are located in a same partition, determining that the partition number of the candidate vertex is the partition number of the first query vertex and the second query vertex; and determining a layer number within a closed interval from the layer number of the first query vertex to the layer number of the second query vertex as the layer number of the candidate vertex; or when the first query vertex and the second query vertex are located in different partitions, determining that the partition number of the candidate vertex is the partition number of the first query vertex and the second query vertex; for a partition in which the first query vertex is located, determining a layer number within a closed interval from zero to the layer number of the first query vertex as the layer number that is of the candidate vertex and that belongs to a same group as the partition number of the first query vertex; and for a partition in which the second query vertex is located, determining a layer number within a closed interval from zero to the layer number of the second query vertex as the layer number that is of the candidate vertex and that belongs to a same group as the partition number of the second query vertex.

With reference to the sixth possible implementation manner of the first aspect, in a seventh possible implementation manner, the method further includes:

when required graph data fails to be found in the candidate set according to the query condition, extending a layer number interval included in the candidate set to obtain an extended candidate set; and performing graph data query in the extended candidate set according to the query condition.

With reference to the first aspect, in an eighth possible implementation manner, when the graph data in the graph data whole set is stored in a file system, partition numbers and layer numbers of the multiple vertices are stored in one file, graph data of vertices that have a same partition number and layer number are stored in one file, and graph data of vertices that have different partition numbers and layer numbers are stored in different files.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner, the performing graph data query in the candidate set according to the query condition specifically includes:

loading graph data of a vertex included in the candidate set into a memory; and performing, according to the query condition, graph data query on graph data that is of the vertex included in the candidate set and that is cached in the memory.

According to a second aspect, a graph data query apparatus is provided, which is applied to query of graph data in a graph data whole set, where the graph data whole set includes multiple vertices and an edge between every two vertices that have a connection relationship; partitioning and layering are performed in advance on the multiple vertices in the graph data whole set; a number of a partition in which a vertex is located is used as a partition number of the vertex; a shortest distance between a vertex and a partition border of a partition in which the vertex is located is used as a layer number of the vertex; and the query apparatus includes:

an acquiring unit, configured to acquire a query condition, and a partition number and a layer number of a query vertex indicated by the query condition;

a first determining unit, configured to determine, based on the partition number and the layer number of the query vertex, a partition number and a layer number of a candidate vertex indicated by the query condition, and use the partition number and the layer number of the candidate vertex respectively as a candidate partition number and a candidate layer number, where the candidate vertex is a vertex that needs to be queried according to the query condition;

a second determining unit, configured to form a candidate set using a vertex whose partition number and layer number satisfy the candidate partition number and the candidate layer number respectively; and a query unit, configured to perform graph data query in the candidate set according to the query condition.

With reference to the second aspect, in a first possible implementation manner, a layer number of a vertex incapable of reaching a partition border of a partition in which the vertex is located is a default layer number, and the default layer number is different from a layer number of a vertex capable of reaching a partition border of a partition in which the vertex is located;

the first determining unit is further configured to: before determining the partition number and the layer number of the candidate vertex indicated by the query condition, determine whether the layer number of the query vertex is the default layer number; and when a result of the determining is that the layer number of the query vertex is not the default layer number, trigger the step of determining a partition number and a layer number of a candidate vertex indicated by the query condition; and the second determining unit is further configured to: when the layer number of the query vertex is the default layer number, form a candidate set using a vertex whose partition number is the partition number of the query vertex and whose layer number is the default layer number.

With reference to the second aspect, in a second possible implementation manner, for the edge between every two vertices that have a connection relationship, when all of the edges have a same weight or when none of the edges has a weight, a shortest distance between a vertex and a partition border of a partition in which the vertex is located is a smallest hop count between the vertex and the partition border of the partition in which the vertex is located, and a distance between two vertices is a hop count between one vertex of the two vertices and the other vertex; or for the edge between every two vertices that have a connection relationship, when not all of the edges have a same weight, a minimum length in lengths of paths between a vertex and a partition border of a partition in which the vertex is located is used as a shortest distance between the vertex and the partition border of the partition in which the vertex is located, and a distance between two vertices is a length of a path between one vertex of the two vertices and the other vertex, where a length of a path is the sum of weights of edges included in the path.

With reference to the second aspect, in a third possible implementation manner, the first determining unit is specifically configured to determine, based on the partition number and the layer number of the query vertex and according to a distance between the candidate vertex indicated by the query condition and the query vertex, the partition number and the layer number of the candidate vertex.

With reference to the third possible implementation manner of the second aspect, in a fourth possible implementation manner, edge-cut partitioning is performed in advance on the multiple vertices in the graph data whole set; a partition border includes no vertex; and a shortest distance between a vertex that has an edge crossing another partition and a partition border of a partition in which the vertex is located is zero; and the first determining unit is specifically configured to: when the query condition indicates a maximum distance between the candidate vertex and the query vertex, determine the partition number and the layer number of the candidate vertex in the following manner:

when the maximum distance is not greater than the layer number of the query vertex, determine that the partition number of the candidate vertex is the partition number of the query vertex; determine a minimum value between a maximum layer number in a partition in which the query vertex is located and a value obtained by adding the layer number of the query vertex and the maximum distance; and determine a layer number within a closed interval from a value obtained by subtracting the maximum distance from the layer number of the query vertex to the minimum value as the layer number of the candidate vertex; or when the maximum distance is greater than the layer number of the query vertex, determine that the partition number of the candidate vertex is the partition number of the query vertex and a partition number of a neighboring partition of a partition in which the query vertex is located; for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and for each neighboring partition of the partition in which the query vertex is located, determine a minimum value between a maximum layer number of the neighboring partition and a value obtained by subtracting the layer number of the query vertex and then subtracting 1 from the maximum distance, and determine a layer number within a closed interval from zero to the minimum value as the layer number that is of the candidate vertex and that belongs to a same group as a partition number of the neighboring partition.

With reference to the third possible implementation manner of the second aspect, in a fifth possible implementation manner, vertex-cut partitioning is performed in advance on the multiple vertices in the graph data whole set; a partition border includes a vertex; and a shortest distance between the vertex on the partition border and the partition border of a partition in which the vertex is located is zero; and the first determining unit is specifically configured to: when the query condition indicates a maximum distance between the candidate vertex and the query vertex, determine the partition number and the layer number of the candidate vertex in the following manner:

when the maximum distance is not greater than the layer number of the query vertex, determine that the partition number of the candidate vertex is the partition number of the query vertex; determine a minimum value between a maximum layer number in a partition in which the query vertex is located and a value obtained by adding the layer number of the query vertex and the maximum distance; and determine a layer number within a closed interval from a value obtained by subtracting the maximum distance from the layer number of the query vertex to the minimum value as the layer number of the candidate vertex; or when the maximum distance is greater than the layer number of the query vertex, determine that the partition number of the candidate vertex is the partition number of the query vertex and a partition number of a neighboring partition of a partition in which the query vertex is located; for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and for each neighboring partition of the partition in which the query vertex is located, determine a minimum value between a maximum layer number of the neighboring partition and a value obtained by subtracting the layer number of the query vertex from the maximum distance, and determine a layer number within a closed interval from zero to the minimum value as the layer number that is of the candidate vertex and that belongs to a same group as a partition number of the neighboring partition.

With reference to the second aspect, in a sixth possible implementation manner, the acquiring unit is specifically configured to: acquire the query condition; and when the query condition indicates that a shortest path between a first query vertex and a second query vertex needs to be queried, acquire a partition number and a layer number of the first query vertex and a partition number and a layer number of that are the second query vertex; and the first determining unit is specifically configured to: when the first query vertex and the second query vertex are located in a same partition, determine that the partition number of the candidate vertex is the partition number of the first query vertex and the second query vertex; and determine a layer number within a closed interval from the layer number of the first query vertex to the layer number of the second query vertex as the layer number of the candidate vertex; or when the first query vertex and the second query vertex are located in different partitions, determine that the partition number of the candidate vertex is the partition number of the first query vertex and the second query vertex; for a partition in which the first query vertex is located, determine a layer number within a closed interval from zero to the layer number of the first query vertex as the layer number that is of the candidate vertex and that belongs to a same group as the partition number of the first query vertex; and for a partition in which the second query vertex is located, determine a layer number within a closed interval from zero to the layer number of the second query vertex as the layer number that is of the candidate vertex and that belongs to a same group as the partition number of the second query vertex.

With reference to the sixth possible implementation manner of the second aspect, in a seventh possible implementation manner, the second determining unit is further configured to: when the query unit fails to find required graph data in the candidate set according to the query condition, extend a layer number interval included in the candidate set to obtain an extended candidate set; and the query unit is further configured to perform graph data query in the extended candidate set according to the query condition.

With reference to the second aspect, in an eighth possible implementation manner, when the graph data in the graph data whole set is stored in a file system, partition numbers and layer numbers of the multiple vertices are stored in one file, graph data of vertices that have a same partition number and layer number are stored in one file, and graph data of vertices that have different partition numbers and layer numbers are stored in different files.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a ninth possible implementation manner, the query unit is specifically configured to: load graph data of a vertex included in the candidate set into a memory; and perform, according to the query condition, graph data query on graph data that is of the vertex included in the candidate set and that is cached in the memory.

According to a third aspect, a query server is provided, which is applied to query of graph data in a graph data whole set, where the graph data whole set includes multiple vertices and an edge between every two vertices that have a connection relationship; partitioning and layering are performed in advance on the multiple vertices in the graph data whole set; a number of a partition in which a vertex is located is used as a partition number of the vertex; a shortest distance between a vertex and a partition border of a partition in which the vertex is located is used as a layer number of the vertex; and the query server specifically includes:

an interface, configured to receive a query condition;

a processor, configured to: acquire the query condition, and a partition number and a layer number of a query vertex indicated by the query condition; determine, based on the partition number and the layer number of the query vertex, a partition number and a layer number of a candidate vertex indicated by the query condition, and use the partition number and the layer number of the candidate vertex respectively as a candidate partition number and a candidate layer number, where the candidate vertex is a vertex that needs to be queried according to the query condition; form a candidate set using a vertex whose partition number and layer number satisfy the candidate partition number and the candidate layer number respectively; and perform graph data query in the candidate set according to the query condition; and a storage, configured to store the graph data in the graph data whole set and partition numbers and layer numbers of the multiple vertices in the graph data whole set.

With reference to the third aspect, in a first possible implementation manner, a layer number of a vertex incapable of reaching a partition border of a partition in which the vertex is located is a default layer number, and the default layer number is different from a layer number of a vertex capable of reaching a partition border of a partition in which the vertex is located; and the processor is further configured to: before determining the partition number and the layer number of the candidate vertex indicated by the query condition, determine whether the layer number of the query vertex is the default layer number; when a result of the determining is that the layer number of the query vertex is not the default layer number, trigger the step of determining a partition number and a layer number of a candidate vertex indicated by the query condition, or when the layer number of the query vertex is the default layer number, form a candidate set using a vertex whose partition number is the partition number of the query vertex and whose layer number is the default layer number; and perform graph data query in the candidate set according to the query condition.

With reference to the third aspect, in a second possible implementation manner, for the edge between every two vertices that have a connection relationship, when all of the edges have a same weight or when none of the edges has a weight, a shortest distance between a vertex and a partition border of a partition in which the vertex is located is a smallest hop count between the vertex and the partition border of the partition in which the vertex is located, and a distance between two vertices is a hop count between one vertex of the two vertices and the other vertex; or for the edge between every two vertices that have a connection relationship, when not all of the edges have a same weight, a minimum length in lengths of paths between a vertex and a partition border of a partition in which the vertex is located is used as a shortest distance between the vertex and the partition border of the partition in which the vertex is located, and a distance between two vertices is a length of a path between one vertex of the two vertices and the other vertex, where a length of a path is the sum of weights of edges included in the path.

With reference to the third aspect, in a third possible implementation manner, the processor is specifically configured to determine, based on the partition number and the layer number of the query vertex and according to a distance between the candidate vertex indicated by the query condition and the query vertex, the partition number and the layer number of the candidate vertex.

With reference to the third possible implementation manner of the third aspect, in a fourth possible implementation manner, edge-cut partitioning is performed in advance on the multiple vertices in the graph data whole set; a partition border includes no vertex; and a shortest distance between a vertex that has an edge crossing another partition and a partition border of a partition in which the vertex is located is zero; and the processor is specifically configured to: when the query condition indicates a maximum distance between the candidate vertex and the query vertex, determine the partition number and the layer number of the candidate vertex in the following manner:

when the maximum distance is not greater than the layer number of the query vertex, determine that the partition number of the candidate vertex is the partition number of the query vertex; determine a minimum value between a maximum layer number in a partition in which the query vertex is located and a value obtained by adding the layer number of the query vertex and the maximum distance; and determine a layer number within a closed interval from a value obtained by subtracting the maximum distance from the layer number of the query vertex to the minimum value as the layer number of the candidate vertex; or when the maximum distance is greater than the layer number of the query vertex, determine that the partition number of the candidate vertex is the partition number of the query vertex and a partition number of a neighboring partition of a partition in which the query vertex is located; for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and for each neighboring partition of the partition in which the query vertex is located, determine a minimum value between a maximum layer number of the neighboring partition and a value obtained by subtracting the layer number of the query vertex and then subtracting 1 from the maximum distance, and determine a layer number within a closed interval from zero to the minimum value as the layer number that is of the candidate vertex and that belongs to a same group as a partition number of the neighboring partition.

With reference to the third possible implementation manner of the third aspect, in a fifth possible implementation manner, vertex-cut partitioning is performed in advance on the multiple vertices in the graph data whole set; a partition border includes a vertex; and a shortest distance between the vertex on the partition border and the partition border of a partition in which the vertex is located is zero; and the processor is specifically configured to: when the query condition indicates a maximum distance between the candidate vertex and the query vertex, determine the partition number and the layer number of the candidate vertex in the following manner:

when the maximum distance is not greater than the layer number of the query vertex, determine that the partition number of the candidate vertex is the partition number of the query vertex; determine a minimum value between a maximum layer number in a partition in which the query vertex is located and a value obtained by adding the layer number of the query vertex and the maximum distance; and determine a layer number within a closed interval from a value obtained by subtracting the maximum distance from the layer number of the query vertex to the minimum value as the layer number of the candidate vertex; or when the maximum distance is greater than the layer number of the query vertex, determine that the partition number of the candidate vertex is the partition number of the query vertex and a partition number of a neighboring partition of a partition in which the query vertex is located; for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and for each neighboring partition of the partition in which the query vertex is located, determine a minimum value between a maximum layer number of the neighboring partition and a value obtained by subtracting the layer number of the query vertex from the maximum distance, and determine a layer number within a closed interval from zero to the minimum value as the layer number that is of the candidate vertex and that belongs to a same group as a partition number of the neighboring partition.

With reference to the third aspect, in a sixth possible implementation manner, the processor is specifically configured to: acquire the query condition; when the query condition indicates that a shortest path between a first query vertex and a second query vertex needs to be queried, acquire a partition number and a layer number of the first query vertex and a partition number and a layer number of the second query vertex; when the first query vertex and the second query vertex are located in a same partition, determine that the partition number of the candidate vertex is the partition number of the first query vertex and the second query vertex, and determine a layer number within a closed interval from the layer number of the first query vertex to the layer number of the second query vertex as the layer number of the candidate vertex, or when the first query vertex and the second query vertex are located in different partitions, determine that the partition number of the candidate vertex is the partition number of the first query vertex and the second query vertex; for a partition in which the first query vertex is located, determine a layer number within a closed interval from zero to the layer number of the first query vertex as the layer number that is of the candidate vertex and that belongs to a same group as the partition number of the first query vertex; and for a partition in which the second query vertex is located, determine a layer number within a closed interval from zero to the layer number of the second query vertex as the layer number that is of the candidate vertex and that belongs to a same group as the partition number of the second query vertex.

With reference to the sixth possible implementation manner of the third aspect, in a seventh possible implementation manner, the processor is further configured to: when the processor fails to find required graph data in the candidate set according to the query condition, extend a layer number interval included in the candidate set to obtain an extended candidate set; and perform graph data query in the extended candidate set according to the query condition.

With reference to the third aspect, in an eighth possible implementation manner, the storage is specifically configured to: store the graph data in the graph data whole set in a file system, store partition numbers and layer numbers of the multiple vertices in one file, store graph data of vertices that have a same partition number and layer number in one file, and store graph data of vertices that have different partition numbers and layer numbers in different files.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, or the eighth possible implementation manner of the third aspect, in a ninth possible implementation manner, the processor is specifically configured to: load graph data of a vertex included in the candidate set into a memory; and perform, according to the query condition, graph data query on graph data that is of the vertex included in the candidate set and that is cached in the memory.

Beneficial effects of the present invention include:

In the solutions provided in the embodiments of the present invention, a graph data whole set includes multiple vertices and an edge between every two vertices that have a connection relationship; partitioning and layering are performed in advance on the multiple vertices in the graph data whole set; a number of a partition in which a vertex is located is used as a partition number of the vertex; a shortest distance between a vertex and a partition border of a partition in which the vertex is located is used as a layer number of the vertex. When graph data query is performed based on a partition number and a layer number of a vertex, a partition number and a layer number of a query vertex are first acquired; a partition number and a layer number of a candidate vertex indicated by a query condition are determined based on the partition number and the layer number of the query vertex as a candidate partition number and a candidate layer number; form a candidate set using a vertex whose partition number and layer number satisfy any group of a candidate partition number and a candidate layer number; graph data query is performed in the candidate set according to the query condition. A candidate set is selected from a graph data whole set according to a query condition and based on pre-divided partitions and layers of vertices, and a data volume of the candidate set in less than a data volume of the graph data whole set; therefore, performing graph data query in the candidate set improves graph data query efficiency.

Additional features and advantages of this application will be set forth in the specification that follows, and in part will be apparent from the specification, or be learned by practice of this application. Objectives and additional advantages of this application maybe implemented and obtained using structures specially specified in the written specification, claims, and accompanying drawings.

BRIEF DESCRIPTION OF THE DRAWINGS

Accompanying drawings are used to provide further understanding of the present invention, constitute a part of the specification, and are used to explain the present invention together with embodiments of the present invention, which do not constitute a limitation to the present invention. In the accompanying drawings.

DETAILED DESCRIPTION

To give an implementation solution to improving graph data query efficiency, embodiments of the present invention provide a graph data query method and apparatus. The following describes exemplary embodiments of the present invention with reference to the accompanying drawings of this specification. It should be understood that the exemplary embodiments described herein are merely used to describe and explain the present invention, but are not intended to limit the present invention. The embodiments of this application and features in the embodiments may be mutually combined if they do not conflict with each other.

Figure 1:
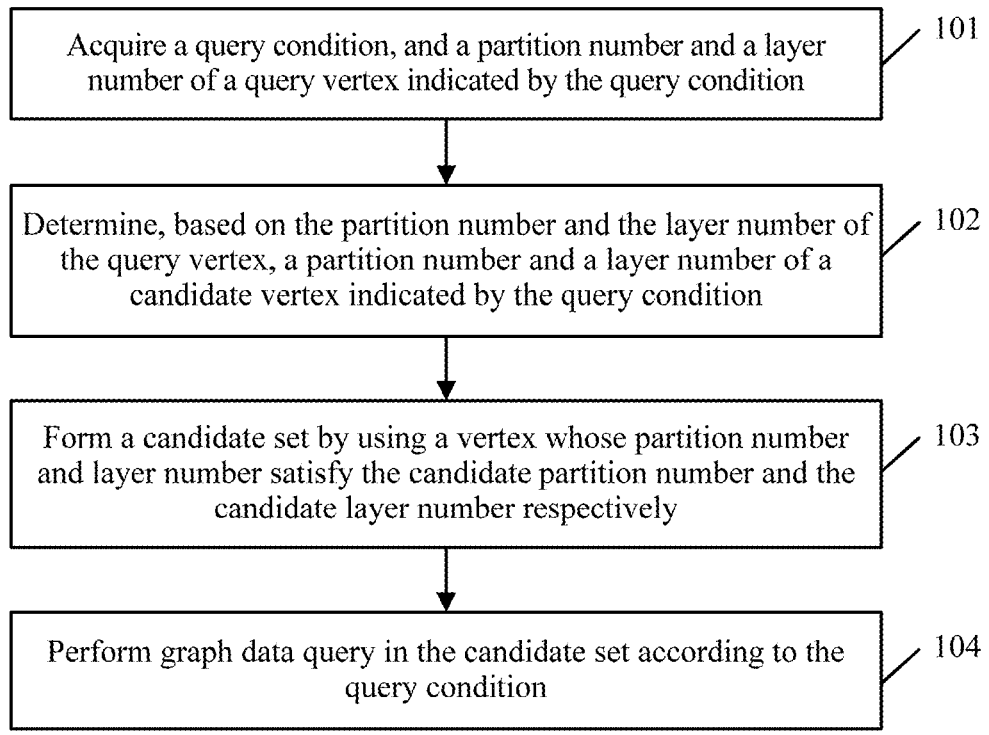
FIG. 1 is a flowchart of a graph data query method according to an embodiment of the present invention.

Embodiments of the present invention provide a graph data query method, which is applied to query of graph data in a graph data whole set, where the graph data whole set includes multiple vertices and an edge between every two vertices that have a connection relationship. In addition, partitioning and layering are performed in advance on the multiple vertices in the graph data whole set; a number of a partition in which a vertex is located is used as a partition number of the vertex; a shortest distance between a vertex and a partition border of a partition in which the vertex is located is used as a layer number of the vertex. As shown in FIG. 1, the method includes:

Step 101. Acquire a query condition, and a partition number and a layer number of a query vertex indicated by the query condition.

Step 102. Determine, based on the partition number and the layer number of the query vertex, a partition number and a layer number of a candidate vertex indicated by the query condition, and use the partition number and the layer number of the candidate vertex respectively as a candidate partition number and a candidate layer number, where the candidate vertex is a vertex that needs to be queried according to the query condition.

Step 103. Form a candidate set using a vertex whose partition number and layer number satisfy the candidate partition number and the candidate layer number respectively.

Step 104. Perform graph data query in the candidate set according to the query condition.

In actual application, there may be some stray vertices in the graph data whole set, which may also be referred to as isolated vertices; that is, these vertices cannot connect to partition borders of partitions in which the vertices are located. When these vertices exist in the graph data whole set, each of layer numbers of these vertices may further be determined as a default layer number, where the default layer number is different from a layer number of a vertex capable of reaching a partition border of a partition in which the vertex is located.

Correspondingly, in the method shown in the foregoing FIG. 1, before the foregoing step 102 of determining a partition number and a layer number of a candidate vertex indicated by the query condition, it may be first determined whether the layer number of the query vertex is the default layer number. If the layer number of the query vertex is not the default layer number, the foregoing step 102 is triggered; otherwise, a candidate set maybe formed using a vertex whose partition number is the partition number of the query vertex and whose layer number is the default layer number, and graph data query is performed in the candidate set according to the query condition. Therefore, query of graph data of the stray vertices in the graph data whole set is implemented.

In the embodiments of the present invention, a new graph data organizing method is provided. That is, partitioning and layering are performed in advance on multiple vertices in a graph data whole set, and a partition number and a layer number of each vertex are determined, so as to perform graph data query based on a result of performing the graph data organizing method.

The following first describes in detail the graph data organizing method provided in the embodiments of the present invention with reference to accompanying drawings.

Embodiment 1

Figure 2:
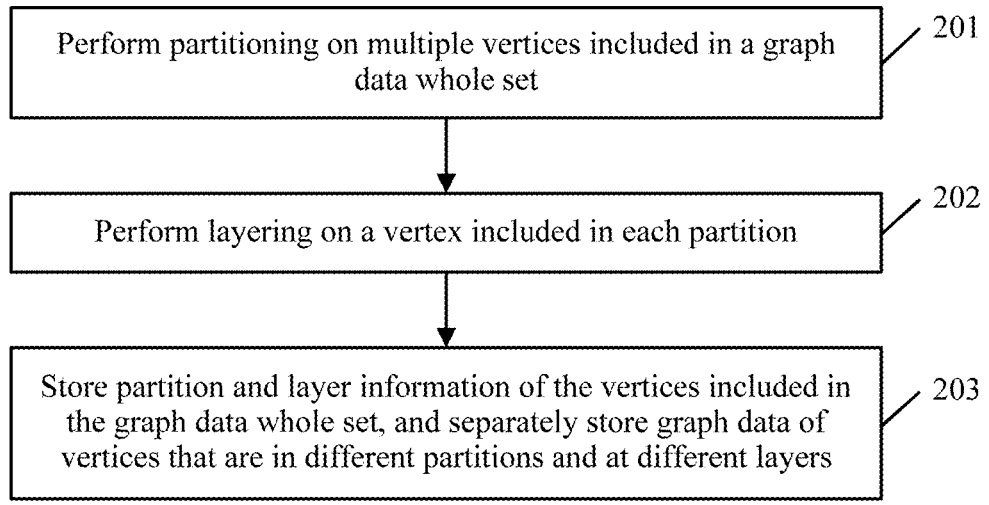
FIG. 2 is a flowchart of organizing graph data in a graph data whole set according to Embodiment 1 of the present invention.

FIG. 2 is a flowchart of organizing graph data in a graph data whole set according to Embodiment 1 of the present invention, which specifically includes the following processing steps:

Step 201. Perform partitioning on multiple vertices included in a graph data whole set.

A partitioning algorithm may be edge-cut partitioning (edge-cut), or may be vertex-cut partitioning (vertex-cut). The following separately describes the two partitioning algorithms.

Figure 3:
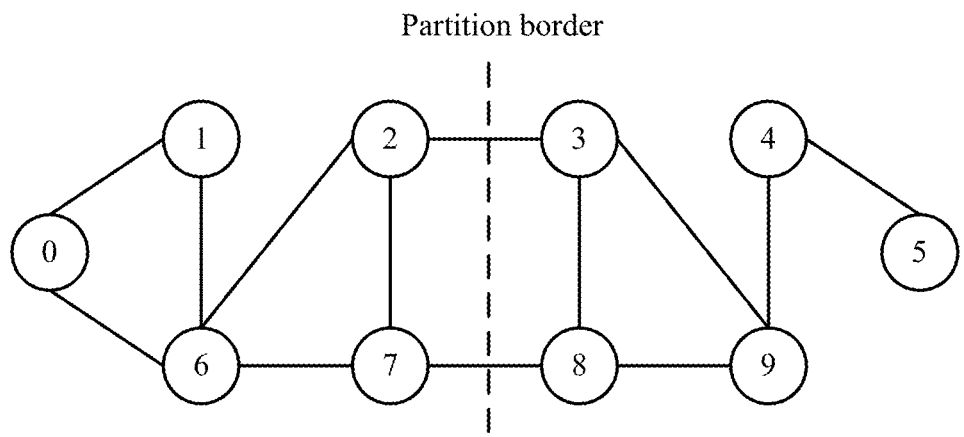
FIG. 3 is a schematic diagram of a partitioning result of performing edge-cut partitioning according to Embodiment 1 of the present invention.

Edge-cut partitioning: As shown in FIG. 3, partitioning is performed on a vertex 0 to a vertex 9. Relationships between vertices of the vertex 0 to the vertex 9 are shown in FIG. 3, and a connection line between two vertices represents an edge between the two vertices.

As shown in FIG. 3, edge-cut partitioning means that an edge between vertices is cut using a partition border. After cutting, the vertex 0, the vertex 1, the vertex 2, the vertex 6, and the vertex 7 are located in a same partition, which may be referred to as a partition 0, that is, a partition number is 0; the vertex 3, the vertex 4, the vertex 5, the vertex 8, and the vertex 9 are located in the other partition, which may be referred to as a partition 1, that is, a partition number is 1.

Figure 4:
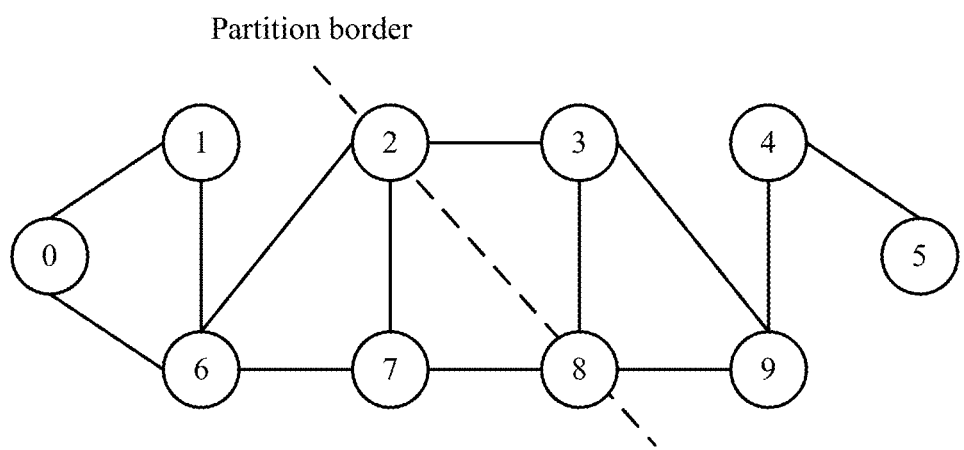
FIG. 4 is a schematic diagram of a partitioning result of performing vertex-cut partitioning according to Embodiment 1 of the present invention.

Vertex-cut partitioning: As shown in FIG. 4, partitioning is performed on the vertex 0 to the vertex 9 that are the same as in FIG. 3.

As shown in FIG. 4, vertex-cut partitioning means that a vertex is cut using a partition border. After cutting, the vertex that is cut may belong to any partition at two sides of the cutting border; for example, the vertex 0, the vertex 1, the vertex 2, the vertex 6, and the vertex 7 are located in a same partition, which may be referred to as a partition 0, that is, a partition number is 0; the vertex 3, the vertex 4, the vertex 5, the vertex 8, and the vertex 9 are located in the other partition, which may be referred to as a partition 1, that is, a partition number is 1.

Step 202. After the multiple vertices included in the graph data whole set are partitioned, perform layering on a vertex included in each partition; put, at a same layer, vertices that have a same shortest distance to partition borders of partitions in which the vertices are located, where the shortest distance is used as a layer number.

In this embodiment of the present invention, for an edge between every two vertices that have a connection relationship, when all of the edges have a same weight or when none of the edges has a weight, a shortest distance between a vertex and a partition border of a partition in which the vertex is located may be a smallest hop count between the vertex and the partition border of the partition in which the vertex is located, and a distance between two vertices is a hop count between one vertex of the two vertices and the other vertex; or for an edge between every two vertices that have a connection relationship, when not all of the edges have a same weight, a minimum length in lengths of paths between a vertex and a partition border of a partition in which the vertex is located is used as a shortest distance between a vertex and a partition border of a partition in which the vertex is located, where a distance between two vertices is a length of a path between one vertex of the two vertices and the other vertex, and a length of a path is the sum of weights of edges included in the path.

Because in actual application, in some application scenarios, a relationship between two vertices may only indicate that the two vertices have a connection relationship; in this case, a weight may not be set for an edge between the two vertices, or a same weight may be set for each edge. For example, in a social network, an edge only indicates that two users represented by two vertices have a friend relationship, and a weight may not be set for the edge. However, in some application scenarios, in addition to indicating that two vertices have a connection relationship, a relationship between the two vertices may further indicate a connection degree; in this case, a weight may be set for an edge between the two vertices, and different weights indicate different connection degrees. For example, in a map, an edge indicates that there is a direct path between geographical locations represented by the two vertices, and a larger weight of the edge indicates a longer path. For example, if a corresponding weight is determined according to a path length range, path lengths within a same range have a same corresponding weight.

For ease of description and to facilitate clear understanding of the solution of this application, in the step, an example in which edges between every two vertices that have a connection relationship have no weight is used to describe a layering result.

Figure 5:
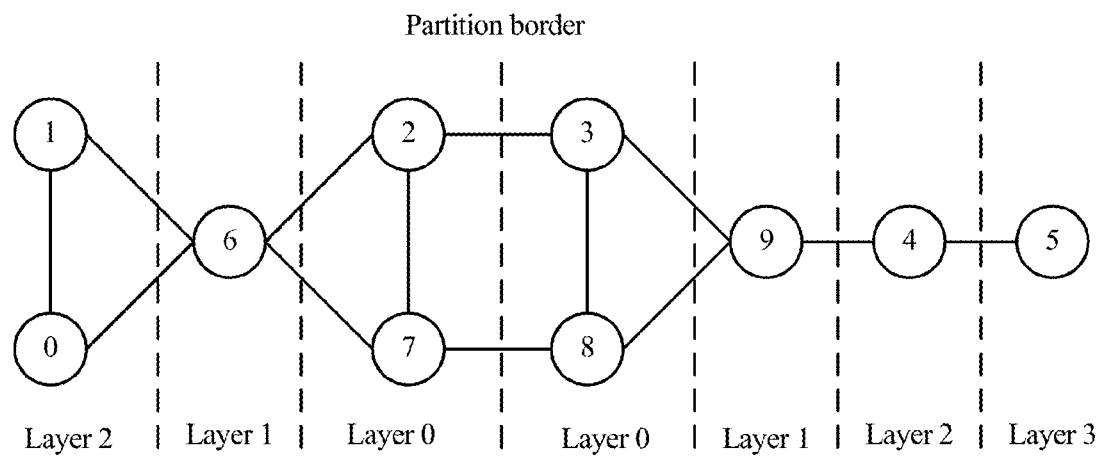
FIG. 5 is a schematic diagram of a result of performing layering on vertices in FIG. 3 after edge-cut partitioning is performed on the vertices according to Embodiment 1 of the present invention.

As shown in FIG. 5, FIG. 5 is a schematic diagram of a result of performing layering on the vertex 0 to the vertex 9 that are in FIG. 3 after edge-cut partitioning is performed on the vertex 0 to the vertex 9. A shortest distance between a vertex that has an edge crossing another partition and a partition border of a partition in which the vertex is located is zero; that is, layer numbers of the vertex 2, the vertex 7, the vertex 3, and the vertex 8 are 0. A hop count from each of the vertex 6 and the vertex 9 to a partition border is 1, that is, a layer number is 1; a hop count between each of the vertex 0, the vertex 1, and the vertex 4 and the partition border is 2, that is, a layer number is 2; a hop count between the vertex 5 and the partition border is 3, that is, a layer number is 3.

Figure 6:
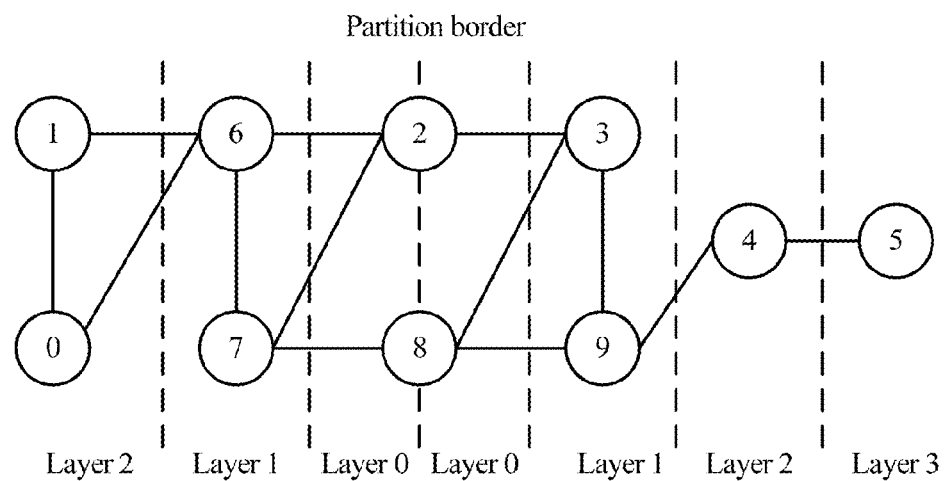
FIG. 6 is a schematic diagram of a result of performing layering on vertices in FIG. 4 after vertex-cut partitioning is performed on the vertices according to Embodiment 1 of the present invention.

As shown in FIG. 6, FIG. 6 is a schematic structural diagram of performing layering on the vertex 0 to the vertex 9 that are in FIG. 4 after vertex-cut partitioning is performed on the vertex 0 to the vertex 9. A shortest distance between a vertex on a partition border and the partition border of a partition in which the vertex is located is zero; that is, layer numbers of the vertex 2 and the vertex 8 are 0. A hop count between each of the vertex 6, the vertex 7, the vertex 3, and the vertex 9 and a partition border is 1, that is, a layer number is 1; a hop count between each of the vertex 0, the vertex 1, and the vertex 4 and the partition border is 2, that is, a layer number is 2; a hop count between the vertex 5 and the partition border is 3, that is, a layer number is 3.

Step 203. After partitioning and layering are performed on the vertices in the graph data whole set, store partition and layer information of the vertices included in the graph data whole set, that is, a partition number and a layer number of each vertex; and optionally, store graph data in the graph data whole set based on partitioning and layering results, that is, separately store graph data of vertices that are in different partitions and at different layers.

For example, when the graph data in the graph data whole set is stored in a file system, such as a distributed file system (HDFS, Hadoop Distributed File System), partition and layer information (a partition number and a layer number) of the multiple vertices may be stored in an independent file; graph data of vertices that have a same partition number and layer number is stored in an independent file; graph data of vertices that have different partition numbers and layer numbers are stored in different files.

For another example, when the graph data is stored in a graph database, partition and layer information of the multiple vertices may be stored in a form of a table in the database.

For another example, when a matrix is used to indicate an adjacency relationship between the graph data, a system, such as a GBASE database system in the prior art, that is, a scalable universal graph data management system, may convert query of graph data into calculation of the matrix. In this case, a matrix corresponding to an unprocessed original graph shown in FIG. 3 or FIG. 4 is represented as follows:

$$\begin{bmatrix} & 1 & & & & 1 & & & & \\ 1 & & & & & & 1 & & & \\ & & & 1 & & & 1 & 1 & & \\ & & 1 & & & & & & 1 & 1 \\ & & & & & 1 & & & & 1 \\ & & & 1 & & & & & & \\ 1 & 1 & 1 & & & & & & 1 & \\ & 1 & & & & & 1 & & & 1 \\ & & 1 & & & & & 1 & & 1 \\ & & & 1 & 1 & & & & 1 & \end{bmatrix}.$$

That an element (m, n) is 1 indicates that there is a connection relationship between an $m^{th}$ vertex and an $n^{th}$ vertex.

Figure 7:
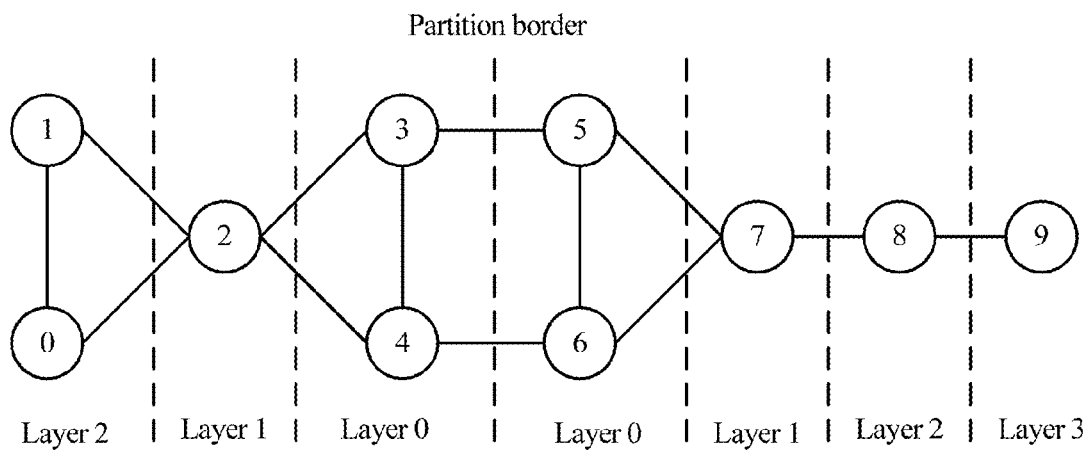
FIG. 7 is a schematic structural diagram obtained after vertices are renumbered according to Embodiment 1 of the present invention.

After partitioning and layering are performed on the multiple vertices using the foregoing steps, the vertices may be renumbered so as to successively show vertices at a same layer in the matrix. A renumbering manner is that vertices at a same layer are successively numbered and vertices in neighboring partitions are successively numbered. A renumbering result is shown in FIG. 7, and a corresponding matrix obtained after renumbering is represented as follows:

$$\begin{bmatrix} & 1 & 1 & & & & & & & \\ 1 & & 1 & & & & & & & \\ 1 & 1 & & 1 & 1 & & & & & \\ & & & 1 & & 1 & 1 & & & \\ & & 1 & 1 & & & 1 & & & \\ & & & 1 & & & 1 & 1 & & \\ & & & & 1 & 1 & & & 1 & \\ & & & & & 1 & 1 & & 1 & \\ & & & & & & 1 & 1 & & 1 \\ & & & & & & & & 1 & \end{bmatrix}.$$

In this step, the graph data of the vertices in the different partitions and at different layers is separately stored, so that in a subsequent graph data query process, graph data of a vertex included in a candidate set can be acquired more conveniently. Therefore, graph data query efficiency is further improved.

In Embodiment 1 of the present invention, an example in which vertices included in a graph data whole set are divided into two partitions is used to describe a solution to organizing graph data in the graph data whole set. In actual application, the vertices included in the graph data whole set may also be divided into more partitions, which is also applicable to a graph data query method provided in this embodiment of the present invention.

In this embodiment of the present invention, after graph data in a graph data whole set is organized using a procedure shown in the foregoing Embodiment 1, that is, after partitioning and layering are performed on vertices and the graph data is stored, graph data query may be performed based on the result.

When graph data query is performed, corresponding query procedures may be used according to different query conditions. For example, when a query condition can indicate a distance between a candidate vertex and a query vertex, a procedure shown in the following Embodiment 2 may be used to perform query.

Embodiment 2

In Embodiment 2 of the present invention, a query condition according to which graph data query is performed can indicate a query vertex and a distance between a candidate vertex and the query vertex, where the candidate vertex is a vertex that needs to be determined, by means of query, whether the vertex satisfies the query condition.

For example, if particular attribute data of a particular vertex is queried, the vertex is a query vertex. For another example, a vertex represents a user, and it is queried whether a person with a specified name is a friend of a particular user's friend; in this case, the vertex corresponding to the user is a query vertex, and a candidate vertex is a vertex that has a friend relationship with the vertex and a vertex that has a friend relationship with the friend of the vertex, that is, a distance between the candidate vertex and the query vertex includes 1 and 2. For another example, a vertex represents a geographical location, and attribute data of a vertex is queried, where a distance between the two vertices satisfies a preset range; in this case, a distance between a candidate vertex and the vertex includes a distance within the preset range.

Figure 8:
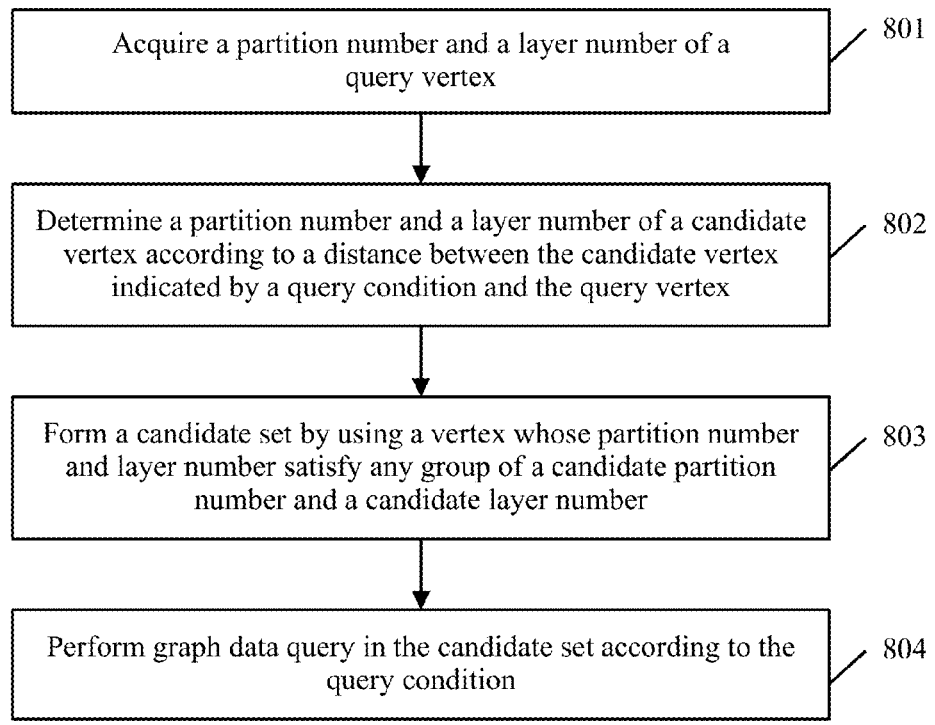
FIG. 8 is a flowchart of a graph data query method according to Embodiment 2 of the present invention.

FIG. 8 is a flowchart of a graph data query method according to Embodiment 2 of the present invention, which specifically includes the following processing steps:

Step 801. Acquire a partition number and a layer number of a query vertex.

The partition number and the layer number of the query vertex may be acquired from a query condition.

Step 802. Determine, based on the partition number and the layer number of the query vertex and according to a distance between a candidate vertex indicated by the query condition and the query vertex, a partition number and a layer number of the candidate vertex, and use the partition number and the layer number of the candidate vertex respectively as a candidate partition number and a candidate layer number, where the candidate vertex is a vertex that needs to be queried according to the query condition.

In this step, an example in which the query condition can indicate a maximum distance between the candidate vertex and the query vertex is used for description. In this case, the determined partition number and layer number of the candidate vertex may include multiple groups of partition numbers and layer numbers, and in a same partition, the layer number may be a layer number included in a layer number interval, which is separately described below according to edge-cut partitioning and vertex-cut partitioning:

Manner 1: In this manner, edge-cut partitioning are performed on multiple vertices in a graph data whole set; a partition border includes no vertex; a shortest distance between a vertex that has an edge crossing another partition and a partition border of a partition in which the vertex is located is zero.

This manner includes the following steps:

Step a. When the query condition indicates the maximum distance between the candidate vertex and the query vertex, first determine whether the maximum distance K is greater than the layer number L of the query vertex. If the maximum distance K is not greater than the layer number L of the query vertex, go to step b; if the maximum distance K is greater than the layer number L of the query vertex, go to step e.

Step b. When the maximum distance K is not greater than the layer number L of the query vertex, determine that the partition number of the candidate vertex is the partition number of the query vertex, and then go to step c.

Step c. Determine a minimum value between a maximum layer number $L_{max}$ of a partition in which the query vertex is located and a value obtained by adding the layer number L of the query vertex and the maximum distance K, that is $min(L+K, L_{max})$ and then go to step d.

Step d. Determine a layer number within a closed interval from a value obtained by subtracting the maximum distance K from the layer number L of the query vertex to the minimum value $min(L+K, L_{max})$, that is, the layer number within the interval $[L-K, min(L+K, L_{max})]$, as the layer number of the candidate vertex.

Step e. When the maximum distance K is greater than the layer number L of the query vertex, determine that the partition number of the candidate vertex is the partition number of the query vertex and a partition number of a neighboring partition of a partition in which the query vertex is located, and then go to step f.

Step f. For the partition in which the query vertex is located, determine a minimum value between a maximum layer number $L_{max}$ in the partition in which the query vertex is located and a value obtained by adding the layer number L of the query vertex and the maximum distance K, that is $min(L+K, L_{max})$, and then go to step g.

Step g. Determine a layer number within a closed interval from zero to the minimum value $min(L+K, L_{max})$, that is, the layer number within the interval $[0, min(L+K, L_{max})]$, as the layer number that is of the candidate vertex and that belongs to a same group as the partition number of the query vertex, and then go to step h.

Step h. For each neighboring partition of the partition in which the query vertex is located, determine a minimum value between a maximum layer number $L_{max}$ of the neighboring partition and a value obtained by subtracting the layer number L of the query vertex and then subtracting 1 from the maximum distance K, that is, $min(K-L-1, L_{max})$, and then go to step i.

Step i. Determine a layer number within a closed interval from zero to the minimum value $min(K-L-1, L_{max})$ as the layer number that is of the candidate vertex and that belongs to a same group as a partition number of the neighboring partition, that is, the layer number with the interval $[0, min(K-L-1, L_{max})]$.

Manner 2: In this manner, vertex-cut partitioning are performed on multiple vertices in a graph data whole set; a partition border includes a vertex; a shortest distance between the vertex on the partition border and the partition border of a partition in which the vertex is located is zero.

This manner includes the following steps:

Step a. When the query condition indicates the maximum distance between the candidate vertex and the query vertex, first determine whether the maximum distance K is greater than the layer number L of the query vertex. If the maximum distance K is not greater than the layer number L of the query vertex, go to step b; if the maximum distance K is greater than the layer number L of the query vertex, go to step e.

Step b. When the maximum distance K is not greater than the layer number L of the query vertex, determine that the partition number of the candidate vertex is the partition number of the query vertex, and then go to step c.

Step c. Determine a minimum value between a maximum layer number $L_{max}$ of a partition in which the query vertex is located and a value obtained by adding the layer number L of the query vertex and the maximum distance K, that is $min(L+K, L_{max})$ and then go to step d.

Step d. Determine a layer number within a closed interval from a value obtained by subtracting the maximum distance K from the layer number L of the query vertex to the minimum value $min(L+K, L_{max})$, that is, the layer number within the interval $[L-K, min(L+K, L_{max})]$, as the layer number of the candidate vertex.

Step e. When the maximum distance K is greater than the layer number L of the query vertex, determine that the partition number of the candidate vertex is the partition number of the query vertex and a partition number of a neighboring partition of a partition in which the query vertex is located, and then go to step f.

Step f. For the partition in which the query vertex is located, determine a minimum value between a maximum layer number $L_{max}$ in the partition in which the query vertex is located and a value obtained by adding the layer number L of the query vertex and the maximum distance K that is $min(L+K, L_{max})$, and then go to step g.

Step g. Determine a layer number within a closed interval from zero to the minimum value $min(L+K, L_{max})$, that is, the layer number within the interval $[0, min(L+K, L_{max})]$, as the layer number that is of the candidate vertex and that belongs to a same group as the partition number of the query vertex, and then go to step h.

Step h. For each neighboring partition of the partition in which the query vertex is located, determine a minimum value between a maximum layer number $L_{max}$ of the neighboring partition and a value obtained by subtracting the layer number L of the query vertex from the maximum distance K, that is $min(K-L, L_{max})$, and then go to step i.

Step i. Determine a layer number within a closed interval from zero to the minimum value $min(K-L, L_{max})$ as the layer number that is of the candidate vertex and that belongs to a same group as a partition number of the neighboring partition, that is, the layer number with the interval $[0, min(K-L, L_{max})]$.

Step 803. Form a candidate set using a vertex whose partition number and layer number satisfy any group of a candidate partition number and a candidate layer number.

That is, a candidate set is formed using a vertex included in each group of a candidate partition number and a candidate layer number determined in the foregoing step 802.

Step 804. Perform graph data query in the candidate set according to the query condition.

Embodiment 3

In Embodiment 3 of the present invention, a query condition according to which graph data query is performed indicates two query vertices, which are a first query vertex and a second query vertex respectively, and the query condition can indicate that a shortest path between the first query vertex and the second query vertex needs to be queried.

For example, a shortest distance between two geographical locations is queried.

Figure 9:
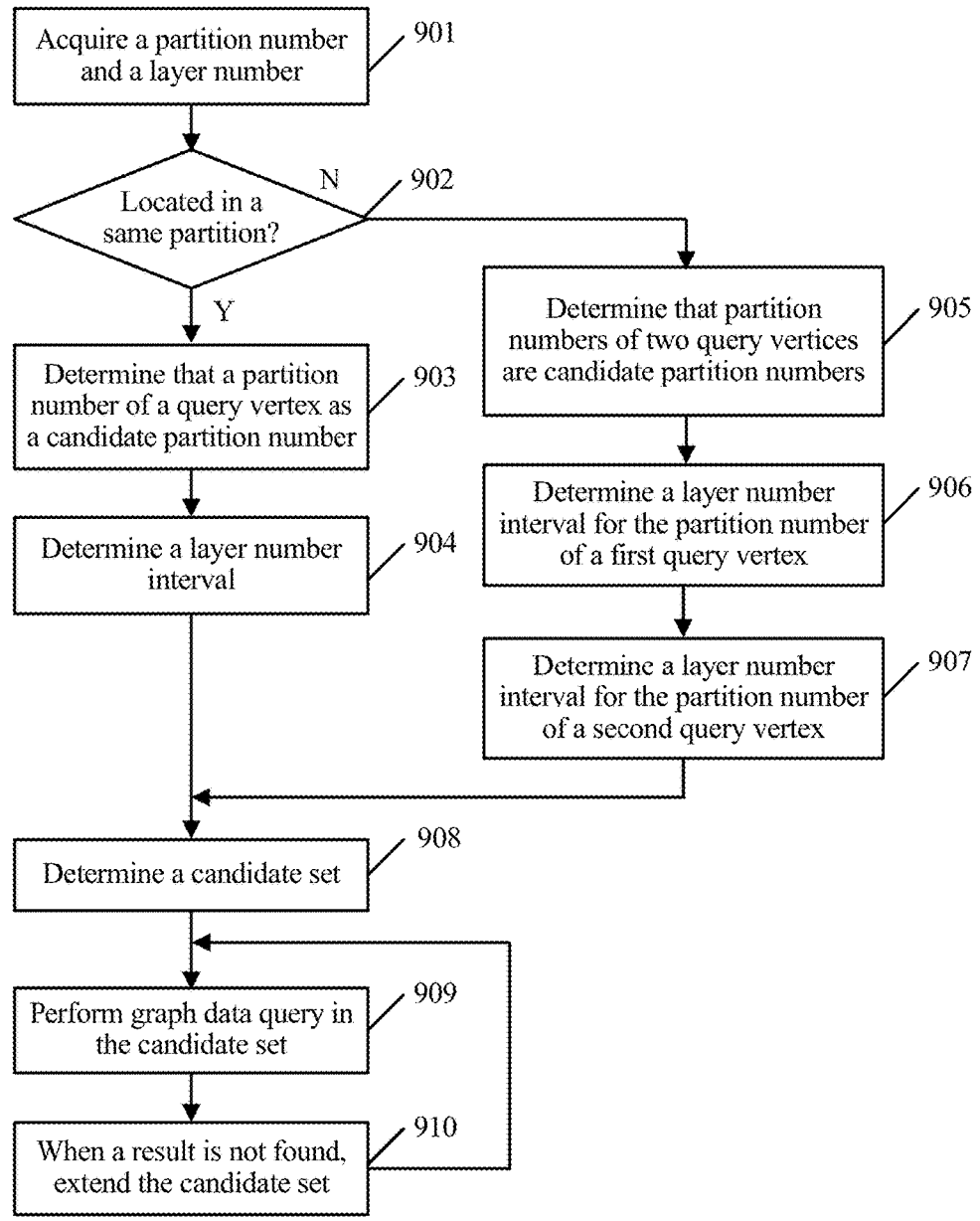
FIG. 9 is a flowchart of a graph data query method according to Embodiment 3 of the present invention.

FIG. 9 is a flowchart of a graph data query method according to Embodiment 3 of the present invention, which specifically includes the following processing steps:

Step 901. Acquire a partition number and a layer number of a first query vertex and a partition number and a layer number of a second query vertex.

The partition numbers and the layer numbers of the first query vertex and the second query vertex may be acquired from a query condition.

Step 902. Determine whether the first query vertex and the second query vertex are located in a same partition. If the first query vertex and the second query vertex are located in a same partition, go to step 903; otherwise, go to step 905.

Step 903. When the first query vertex and the second query vertex are located in a same partition, determine that a partition number of a candidate vertex is the partition number of the first query vertex and the second query vertex.

Step 904. Determine a layer number within a closed interval from the layer number L1 of the first query vertex to the layer number L2 of the second query vertex, that is, a layer number within the interval $[L_1, L_2]$ when it is assumed that L1 is less than L2, as a layer number of the candidate vertex.

Step 905. When the first query vertex and the second query vertex are located in different partitions, determine that a partition number of a candidate vertex is the partition number of the first query vertex and the second query vertex.

Step 906. For a partition in which the first query vertex is located, determine a layer number within a closed interval from zero to the layer number L1 of the first query vertex, that is, a layer number within the interval $[0, L_1]$, as a layer number that is of the candidate vertex and that belongs to a same group as the partition number of the first query vertex.

Step 907. For a partition in which the second query vertex is located, determine a layer number within a closed interval from zero to the layer number L2 of the second query vertex, that is, a layer number within the interval $[0, L_2]$, as a layer number that is of the candidate vertex and that belongs to a same group as the partition number of the second query vertex.

Step 908. Form a candidate set using a vertex whose partition number and layer number satisfy any group of a candidate partition number and a candidate layer number.

That is, a candidate set is formed using a vertex corresponding to each group of a candidate partition number and a candidate layer number determined in the foregoing step 901 to step 907i.

Step 909. Perform graph data query in the current candidate set according to the query condition.

In this step, once a query result is obtained, current query ends.

However, in some actual application scenarios, expected graph data may not be found when graph data query is performed in the candidate set determined in the foregoing manner. For example, a distance between the first query vertex and the second query vertex may not be found. In this case, the method may further include the following step:

Step 910. When required graph data fails to be found in the current candidate set according to the query condition, extend a layer number interval included in the candidate set to obtain an extended candidate set, and use the extended candidate set as a new candidate set. Return to the foregoing step 909, that is, perform graph data query in the extended candidate set according to the query condition.

In this step, extending the layer number interval included in the candidate set may be extending a preset quantity of layer each time, for example, extending one layer each time.

Certainly, when a particular border value of the layer number interval is already a border value of a layer number in a partition to which the particular border value belongs, this border value does not need to be extended. When two border values of the layer number interval cannot be further extended, a range of the candidate set may be extended to a neighboring partition of a current partition, and extension is performed according to an ascending order of layer numbers of the neighboring partition.

Embodiment 4

Figure 10:
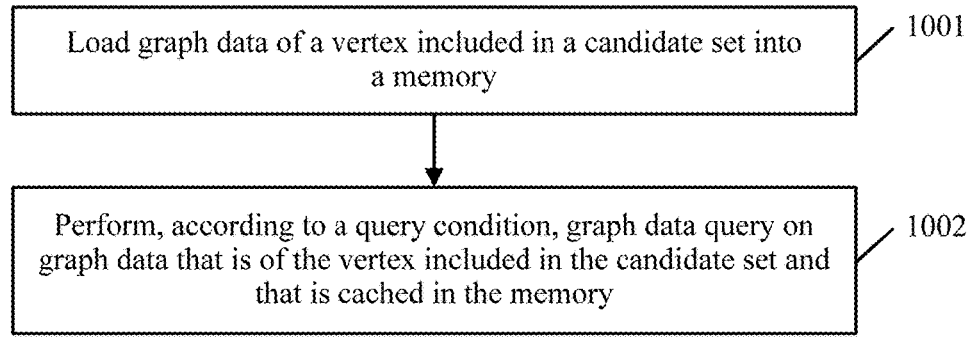
FIG. 10 is a flowchart of performing graph data query in a candidate set according to Embodiment 4 of the present invention.

In Embodiment 4 of the present invention, the foregoing method in which graph data query is performed in a candidate set according to a query condition is described in detail. As shown in FIG. 10, the method includes:

Step 1001. Load graph data of a vertex included in a candidate set into a memory.

In this step, the graph data of the vertex included in the candidate set may be loaded into the memory at a time, so as to reduce a graph data loading time, thereby improving graph data query efficiency.

Step 1002. Perform, according to a query condition, graph data query on graph data that is of the vertex included in the candidate set and that is cached in the memory.

Currently, there is a memory-based graph data management system named Trinity system in the prior art. In the Trinity system, a vertex or an edge in a graph is represented as a cell, where the cell may have two forms, including a running form (runtime form) and a binary form (blob form). A cell in the runtime form is represented as an object in a memory, that is, graph data that has been loaded, where the cell in the runtime form is used for calculation and query, and has a relatively large memory occupancy. A cell in the blob form is represented as an object in a binary format, has a small memory occupancy, and can directly interact with a disk (if a memory is insufficient or a cell is not accessed for a long time, the system may transfer the cell from the memory (swap) to a disk, and a cell can be transferred to a disk only after being converted from the runtime form to the blob form, which is equivalent to performing serialization).

In the prior art, when graph data query is performed based on the Trinity system, for a current vertex, whether graph data of the current vertex has been loaded into a memory needs to be first determined. If the graph data of the current vertex has not been loaded, the graph data of the current vertex is loaded into the memory; if the graph data of the current vertex has been loaded, or after current loading, it is determined whether a form of the graph data of the current vertex is the runtime form. If the form of the graph data of the current vertex is not the runtime form, the form of the graph data of the current vertex is converted into the runtime form, and query is performed based on the graph data in the runtime form.

In a query, when query needs to be performed on graph data of multiple vertices, the foregoing procedure needs to be performed each time a vertex that currently needs to be queried is to be determined; therefore, in the query, the foregoing determining step needs to be executed for multiple times, and the foregoing loading and conversion steps may also need to be executed for multiple times, thereby causing relatively low query efficiency.

However, in the solution provided in this embodiment of the present invention, when graph data query is performed based on the Trinity system, because a candidate set has been determined in advance, graph data of a vertex included in the candidate set may be loaded into a memory at a time using the foregoing step 1001, and a form of the graph data of the vertex included in the candidate set is converted into the runtime form at a time, that is, determining of whether the graph data has been loaded and whether conversion needs to be performed is avoided, and a quantity of loading times is decreased, thereby reducing a graph data loading time, and further improving graph data query efficiency.

Currently, a GBASE database system in the prior art is a scalable universal graph data management system. In the GBASE database system, a matrix is used to indicate an adjacency relationship between graph data, and query or calculation of graph data is converted into calculation of the matrix, which includes two stages: stage 1 (Index Stage) and stage 2 (Query Stage).

Stage 1: First, graph data is converted into a matrix for representation; then, clustering, reordering, and the like are performed on the graph data; next, blocking and compression are performed; finally, a block is stored in a file system.

Stage 2: First, a query request is converted into a query vector; then, a related block is read according to a query type, and a candidate matrix is established; next, a result vector is obtained by multiplying the candidate matrix by the vector; finally, a corresponding operation is performed according to the result vector.

For a solution to performing graph data query based on the GBASE database system in the prior art, reference may be made to the prior art, and details are not described herein again.

However, in the prior art, in the case of performing graph data query based on the GBASE database system, when a candidate matrix is being established, all blocks in a line or a column in which a query vertex is located need to be loaded, but some blocks obviously do not meet a query condition; in this case, because a data volume of loaded graph data is relatively large, efficiency is relatively low in subsequent query.

However, in the solution provided in this embodiment of the present invention, when graph data query is performed based on the GBASE database system, only a block that is in a candidate set and in a line or a column in which a query vertex is located may be loaded, so that a data volume of loaded graph data is decreased, thereby reducing a data loading processing time, and decreasing a data volume on which subsequent query is based, and further improving graph data query efficiency.

Embodiment 5

Figure 11:
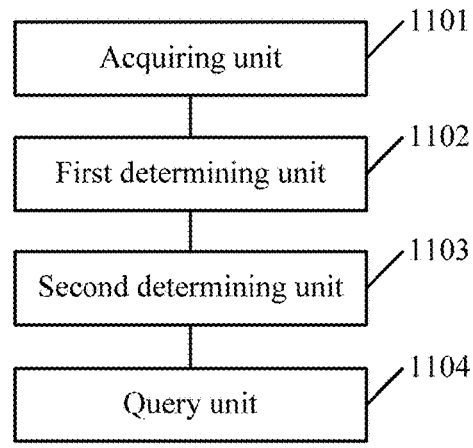
FIG. 11 is a schematic structural diagram of a graph data query apparatus according to Embodiment 5 of the present invention.

Based on a same invention idea and according to the graph data query method provided in the foregoing embodiment of the present invention, correspondingly, Embodiment 5 of the present invention further provides a graph data query apparatus, which is applied to query of graph data in a graph data whole set, where the graph data whole set includes multiple vertices and an edge between every two vertices that have a connection relationship; partitioning and layering are performed in advance on the multiple vertices in the graph data whole set; a number of a partition in which a vertex is located is used as a partition number of the vertex; a shortest distance between a vertex and a partition border of a partition in which the vertex is located is used as a layer number of the vertex. A schematic structural diagram of the query apparatus is shown in FIG. 11, and the query apparatus specifically includes:

an acquiring unit 1101, configured to acquire a query condition, and a partition number and a layer number of a query vertex indicated by the query condition;

a first determining unit 1102, configured to determine, based on the partition number and the layer number of the query vertex, a partition number and a layer number of a candidate vertex indicated by the query condition, and use the partition number and the layer number of the candidate vertex respectively as a candidate partition number and a candidate layer number, where the candidate vertex is a vertex that needs to be queried according to the query condition;

a second determining unit 1103, configured to form a candidate set using a vertex whose partition number and layer number satisfy the candidate partition number and the candidate layer number respectively; and a query unit 1104, configured to perform graph data query in the candidate set according to the query condition.

Further, a layer number of a vertex incapable of reaching a partition border of a partition in which the vertex is located is a default layer number, and the default layer number is different from a layer number of a vertex capable of reaching a partition border of a partition in which the vertex is located;

the first determining unit 1102 is further configured to: before determining the partition number and the layer number of the candidate vertex indicated by the query condition, determine whether the layer number of the query vertex is the default layer number; and when a result of the determining is that the layer number of the query vertex is not the default layer number, trigger the step of determining a partition number and a layer number of a candidate vertex indicated by the query condition; and the second determining unit 1103 is further configured to: when the layer number of the query vertex is the default layer number, form a candidate set using a vertex whose partition number is the partition number of the query vertex and whose layer number is the default layer number.

Further, for the edge between every two vertices that have a connection relationship, when all of the edges have a same weight or when none of the edges has a weight, a shortest distance between a vertex and a partition border of a partition in which the vertex is located is a smallest hop count between the vertex and the partition border of the partition in which the vertex is located, and a distance between two vertices is a hop count between one vertex of the two vertices and the other vertex; or for the edge between every two vertices that have a connection relationship, when not all of the edges have a same weight, a minimum length in lengths of paths between a vertex and a partition border of a partition in which the vertex is located is used as a shortest distance between the vertex and the partition border of the partition in which the vertex is located, and a distance between two vertices is a length of a path between one vertex of the two vertices and the other vertex, where a length of a path is the sum of weights of edges included in the path.

Further, the first determining unit 1102 is specifically configured to determine, based on the partition number and the layer number of the query vertex and according to a distance between the candidate vertex indicated by the query condition and the query vertex, the partition number and the layer number of the candidate vertex.

Further, edge-cut partitioning is performed in advance on the multiple vertices in the graph data whole set; a partition border includes no vertex; and a shortest distance between a vertex that has an edge crossing another partition and a partition border of a partition in which the vertex is located is zero; and the first determining unit 1102 is specifically configured to: when the query condition indicates a maximum distance between the candidate vertex and the query vertex, determine the partition number and the layer number of the candidate vertex in the following manner:

when the maximum distance is not greater than the layer number of the query vertex, determine that the partition number of the candidate vertex is the partition number of the query vertex; determine a minimum value between a maximum layer number in a partition in which the query vertex is located and a value obtained by adding the layer number of the query vertex and the maximum distance; and determine a layer number within a closed interval from a value obtained by subtracting the maximum distance from the layer number of the query vertex to the minimum value as the layer number of the candidate vertex; or when the maximum distance is greater than the layer number of the query vertex, determine that the partition number of the candidate vertex is the partition number of the query vertex and a partition number of a neighboring partition of a partition in which the query vertex is located; for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and for each neighboring partition of the partition in which the query vertex is located, determine a minimum value between a maximum layer number of the neighboring partition and a value obtained by subtracting the layer number of the query vertex and then subtracting 1 from the maximum distance, and determine a layer number within a closed interval from zero to the minimum value as the layer number that is of the candidate vertex and that belongs to a same group as a partition number of the neighboring partition.

Further, vertex-cut partitioning is performed in advance on the multiple vertices in the graph data whole set; a partition border includes a vertex; and a shortest distance between the vertex on the partition border and the partition border of a partition in which the vertex is located is zero; and the first determining unit 1102 is specifically configured to: when the query condition indicates a maximum distance between the candidate vertex and the query vertex, determine the partition number and the layer number of the candidate vertex in the following manner:

when the maximum distance is not greater than the layer number of the query vertex, determine that the partition number of the candidate vertex is the partition number of the query vertex; determine a minimum value between a maximum layer number in a partition in which the query vertex is located and a value obtained by adding the layer number of the query vertex and the maximum distance; and determine a layer number within a closed interval from a value obtained by subtracting the maximum distance from the layer number of the query vertex to the minimum value as the layer number of the candidate vertex; or when the maximum distance is greater than the layer number of the query vertex, determine that the partition number of the candidate vertex is the partition number of the query vertex and a partition number of a neighboring partition of a partition in which the query vertex is located; for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and for each neighboring partition of the partition in which the query vertex is located, determine a minimum value between a maximum layer number of the neighboring partition and a value obtained by subtracting the layer number of the query vertex from the maximum distance, and determine a layer number within a closed interval from zero to the minimum value as the layer number that is of the candidate vertex and that belongs to a same group as a partition number of the neighboring partition.

Further, the acquiring unit 1101 is specifically configured to: acquire the query condition; and when the query condition indicates that a shortest path between a first query vertex and a second query vertex needs to be queried, acquire a partition number and a layer number of the first query vertex and a partition number and a layer number of the second query vertex; and the first determining unit 1102 is specifically configured to: when the first query vertex and the second query vertex are located in a same partition, determine that the partition number of the candidate vertex is the partition number of the first query vertex and the second query vertex; and determine a layer number within a closed interval from the layer number of the first query vertex to the layer number of the second query vertex as the layer number of the candidate vertex; or when the first query vertex and the second query vertex are located in different partitions, determine that the partition number of the candidate vertex is the partition number of the first query vertex and the second query vertex; for a partition in which the first query vertex is located, determine a layer number within a closed interval from zero to the layer number of the first query vertex as the layer number that is of the candidate vertex and that belongs to a same group as the partition number of the first query vertex; and for a partition in which the second query vertex is located, determine a layer number within a closed interval from zero to the layer number of the second query vertex as the layer number that is of the candidate vertex and that belongs to a same group as the partition number of the second query vertex.

Further, the second determining unit 1103 is further configured to: when the query unit fails to find required graph data in the candidate set according to the query condition, extend a layer number interval included in the candidate set to obtain an extended candidate set; and the query unit 1104 is further configured to perform graph data query in the extended candidate set according to the query condition.

Further, when the graph data in the graph data whole set is stored in a file system, partition numbers and layer numbers of the multiple vertices are stored in one file, graph data of vertices that have a same partition number and layer number are stored in one file, and graph data of vertices that have different partition numbers and layer numbers are stored in different files.

Further, the query unit 1104 is specifically configured to: load graph data of a vertex included in the candidate set into a memory; and perform, according to the query condition, graph data query on graph data that is of the vertex included in the candidate set and that is cached in the memory.

Functions of foregoing units may be corresponding to corresponding processing steps in the procedure shown in the foregoing embodiment, and details are not described herein again.

Embodiment 6

Figure 12:
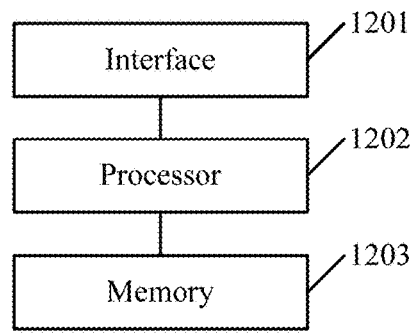
FIG. 12 is a schematic structural diagram of a query server according to Embodiment 6 of the present invention.

Based on a same invention idea and according to the graph data query method provided in the foregoing embodiment of the present invention, correspondingly, Embodiment 6 of the present invention further provides a query server, which is applied to query of graph data in a graph data whole set, where the graph data whole set includes multiple vertices and an edge between every two vertices that have a connection relationship; partitioning and layering are performed in advance on the multiple vertices in the graph data whole set; a number of a partition in which a vertex is located is used as a partition number of the vertex; a shortest distance between a vertex and a partition border of a partition in which the vertex is located is used as a layer number of the vertex. A schematic structural diagram of the query server is shown in FIG. 12, and the query server specifically includes:

an interface 1201, configured to receive a query condition;

a processor 1202, configured to: acquire the query condition, and a partition number and a layer number of a query vertex indicated by the query condition; determine, based on the partition number and the layer number of the query vertex, a partition number and a layer number of a candidate vertex indicated by the query condition, and use the partition number and the layer number of the candidate vertex respectively as a candidate partition number and a candidate layer number, where the candidate vertex is a vertex that needs to be queried according to the query condition; form a candidate set using a vertex whose partition number and layer number satisfy the candidate partition number and the candidate layer number respectively; and perform graph data query in the candidate set according to the query condition; and a storage 1203, configured to store the graph data in the graph data whole set and partition numbers and layer numbers of the multiple vertices in the graph data whole set.

Further, a layer number of a vertex incapable of reaching a partition border of a partition in which the vertex is located is a default layer number, and the default layer number is different from a layer number of a vertex capable of reaching a partition border of a partition in which the vertex is located; and the processor 1202 is further configured to: before determining the partition number and the layer number of the candidate vertex indicated by the query condition, determine whether the layer number of the query vertex is the default layer number; when a result of the determining is that the layer number of the query vertex is not the default layer number, trigger the step of determining a partition number and a layer number of a candidate vertex indicated by the query condition, or when the layer number of the query vertex is the default layer number, form a candidate set using a vertex whose partition number is the partition number of the query vertex and whose layer number is the default layer number; and perform graph data query in the candidate set according to the query condition.

Further, for the edge between every two vertices that have a connection relationship, when all of the edges have a same weight or when none of the edges has a weight, a shortest distance between a vertex and a partition border of a partition in which the vertex is located is a smallest hop count between the vertex and the partition border of the partition in which the vertex is located, and a distance between two vertices is a hop count between one vertex of the two vertices and the other vertex; or for the edge between every two vertices that have a connection relationship, when not all of the edges have a same weight, a minimum length in lengths of paths between a vertex and a partition border of a partition in which the vertex is located is used as a shortest distance between the vertex and the partition border of the partition in which the vertex is located, and a distance between two vertices is a length of a path between one vertex of the two vertices and the other vertex, where a length of a path is the sum of weights of edges included in the path.

Further, the processor 1202 is specifically configured to determine, based on the partition number and the layer number of the query vertex and according to a distance between the candidate vertex indicated by the query condition and the query vertex, the partition number and the layer number of the candidate vertex.

Further, edge-cut partitioning is performed in advance on the multiple vertices in the graph data whole set; a partition border includes no vertex; and a shortest distance between a vertex that has an edge crossing another partition and a partition border of a partition in which the vertex is located is zero; and the processor 1202 is specifically configured to: when the query condition indicates a maximum distance between the candidate vertex and the query vertex, determine the partition number and the layer number of the candidate vertex in the following manner:

when the maximum distance is not greater than the layer number of the query vertex, determine that the partition number of the candidate vertex is the partition number of the query vertex; determine a minimum value between a maximum layer number in a partition in which the query vertex is located and a value obtained by adding the layer number of the query vertex and the maximum distance; and determine a layer number within a closed interval from a value obtained by subtracting the maximum distance from the layer number of the query vertex to the minimum value as the layer number of the candidate vertex; or when the maximum distance is greater than the layer number of the query vertex, determine that the partition number of the candidate vertex is the partition number of the query vertex and a partition number of a neighboring partition of a partition in which the query vertex is located; for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and for each neighboring partition of the partition in which the query vertex is located, determine a minimum value between a maximum layer number of the neighboring partition and a value obtained by subtracting the layer number of the query vertex and then subtracting 1 from the maximum distance, and determine a layer number within a closed interval from zero to the minimum value as the layer number that is of the candidate vertex and that belongs to a same group as a partition number of the neighboring partition.

Further, vertex-cut partitioning is performed in advance on the multiple vertices in the graph data whole set; a partition border includes a vertex; and a shortest distance between the vertex on the partition border and the partition border of a partition in which the vertex is located is zero; and the processor 1202 is specifically configured to: when the query condition indicates a maximum distance between the candidate vertex and the query vertex, determine the partition number and the layer number of the candidate vertex in the following manner:

when the maximum distance is not greater than the layer number of the query vertex, determine that the partition number of the candidate vertex is the partition number of the query vertex; determine a minimum value between a maximum layer number in a partition in which the query vertex is located and a value obtained by adding the layer number of the query vertex and the maximum distance; and determine a layer number within a closed interval from a value obtained by subtracting the maximum distance from the layer number of the query vertex to the minimum value as the layer number of the candidate vertex; or when the maximum distance is greater than the layer number of the query vertex, determine that the partition number of the candidate vertex is the partition number of the query vertex and a partition number of a neighboring partition of a partition in which the query vertex is located; for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and for each neighboring partition of the partition in which the query vertex is located, determine a minimum value between a maximum layer number of the neighboring partition and a value obtained by subtracting the layer number of the query vertex from the maximum distance, and determine a layer number within a closed interval from zero to the minimum value as the layer number that is of the candidate vertex and that belongs to a same group as a partition number of the neighboring partition.

Further, the processor 1202 is specifically configured to: acquire the query condition; when the query condition indicates that a shortest path between a first query vertex and a second query vertex needs to be queried, acquire a partition number and a layer number of the first query vertex and a partition number and a layer number of the second query vertex; when the first query vertex and the second query vertex are located in a same partition, determine that the partition number of the candidate vertex is the partition number of the first query vertex and the second query vertex, and determine a layer number within a closed interval from the layer number of the first query vertex to the layer number of the second query vertex as the layer number of the candidate vertex, or when the first query vertex and the second query vertex are located in different partitions, determine that the partition number of the candidate vertex is the partition number of the first query vertex and the second query vertex; for a partition in which the first query vertex is located, determine a layer number within a closed interval from zero to the layer number of the first query vertex as the layer number that is of the candidate vertex and that belongs to a same group as the partition number of the first query vertex; and for a partition in which the second query vertex is located, determine a layer number within a closed interval from zero to the layer number of the second query vertex as the layer number that is of the candidate vertex and that belongs to a same group as the partition number of the second query vertex.

Further, the processor 1202 is further configured to: when the processor 1202 fails to find required graph data in the candidate set according to the query condition, extend a layer number interval included in the candidate set to obtain an extended candidate set; and perform graph data query in the extended candidate set according to the query condition Further, the storage 1203 is specifically configured to: store the graph data in the graph data whole set in a file system, store partition numbers and layer numbers of the multiple vertices in one file, store graph data of vertices that have a same partition number and layer number in one file, and store graph data of vertices that have different partition numbers and layer numbers indifferent files.

Further, the processor 1202 is specifically configured to: load graph data of a vertex included in the candidate set into a memory; and perform, according to the query condition, graph data query on graph data that is of the vertex included in the candidate set and that is cached in the memory.

In conclusion, the solution provided in the embodiments of the present invention includes: acquiring a partition number and a layer number of a query vertex; determining, based on the partition number and the layer number of the query vertex, a partition number and a layer number of a candidate vertex indicated by a query condition, and using the partition number and the layer number of the candidate vertex respectively as a candidate partition number and a candidate layer number; forming a candidate set using a vertex whose partition number and layer number satisfy any group of a candidate partition number and a candidate layer number; and performing graph data query in the candidate set according to the query condition. Using the solution provided in the embodiments of the present invention, graph data query efficiency is improved.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk storage, a CD-ROM, an optical storage, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable storage that can instruct the computer or any other programmable data processing device to work in a specific manner, so that the instructions stored in the computer readable storage generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A graph data query method, applied to query of graph data in a graph data whole set, wherein the graph data whole set comprises multiple vertices and an edge between every two vertices that have a connection relationship; partitioning and layering are performed on the multiple vertices in the graph data whole set; a number of a partition in which a vertex is located is used as a partition number of the vertex; a shortest distance between a vertex and a partition border of a partition in which the vertex is located is used as a layer number of the vertex; the method comprising:

acquiring a query condition, and a partition number and a layer number of a query vertex indicated by the query condition;

determining, based on the partition number and the layer number of the query vertex, a partition number and a layer number of a candidate vertex indicated by the query condition, and using the partition number and the layer number of the candidate vertex respectively as a candidate partition number and a candidate layer number, wherein the candidate vertex is a vertex that needs to be queried according to the query condition;

forming a candidate set using a vertex whose partition number and layer number satisfy any group of a candidate partition number and a candidate layer number; and performing graph data query in the candidate set according to the query condition.

2. The method according to claim 1, wherein a layer number of a vertex incapable of reaching a partition border of a partition in which the vertex is located is a default layer number, and the default layer number is different from a layer number of a vertex capable of reaching a partition border of a partition in which the vertex is located; and when the layer number of the query vertex is the default layer number, forming the candidate set using the vertex whose partition number and layer number satisfy any group of the candidate partition number and the candidate layer number comprises:

forming a candidate set using a vertex whose partition number is the partition number of the query vertex and whose layer number is the default layer number.

3. The method according to claim 1, wherein for the edge between every two vertices that have a connection relationship, when all of the edges have a same weight, a shortest distance between a vertex and a partition border of a partition in which the vertex is located is a smallest hop count between the vertex and the partition border of the partition in which the vertex is located, and a distance between two vertices is a hop count between one vertex of the two vertices and the other vertex.

4. The method according to claim 1, wherein for the edge between every two vertices that have a connection relationship, when not all of the edges have a same weight, a minimum length in lengths of paths between a vertex and a partition border of a partition in which the vertex is located is used as a shortest distance between the vertex and the partition border of the partition in which the vertex is located, and a distance between two vertices is a length of a path between one vertex of the two vertices and the other vertex, wherein a length of a path is the sum of weights of edges comprised in the path.

5. The method according to claim 1, wherein determining the partition number and the layer number of the candidate vertex indicated by the query condition comprises:

determining, based on the partition number and the layer number of the query vertex and according to a distance between the candidate vertex indicated by the query condition and the query vertex, the partition number and the layer number of the candidate vertex.

6. The method according to claim 5, wherein edge-cut partitioning is performed on the multiple vertices in the graph data whole set; a partition border comprises no vertex; and a shortest distance between a vertex that has an edge crossing another partition and a partition border of a partition in which the vertex is located is zero; and wherein the query condition indicates a maximum distance between the candidate vertex and the query vertex;

when the maximum distance is not greater than the layer number of the query vertex, the determining a partition number and a layer number of the candidate vertex comprises:

determining that the partition number of the candidate vertex is the partition number of the query vertex; determining a minimum value between a maximum layer number in a partition in which the query vertex is located and a value obtained by adding the layer number of the query vertex and the maximum distance; and determining a layer number within a closed interval from a value obtained by subtracting the maximum distance from the layer number of the query vertex to the minimum value as the layer number of the candidate vertex;

when the maximum distance is greater than the layer number of the query vertex, the determining a partition number and a layer number of the candidate vertex specifically comprises:

determining that the partition number of the candidate vertex is the partition number of the query vertex and a partition number of a neighboring partition of a partition in which the query vertex is located;

for the partition in which the query vertex is located, determining a minimum value between a maximum layer number in the partition in which the query vertex is located and a value obtained by adding the layer number of the query vertex and the maximum distance, and determining a layer number within a closed interval from zero to the minimum value as the layer number that is of the candidate vertex and that belongs to a same group as the partition number of the query vertex; and for each neighboring partition of the partition in which the query vertex is located, determining a minimum value between a maximum layer number of the neighboring partition and a value obtained by subtracting the layer number of the query vertex and then subtracting 1 from the maximum distance, and determining a layer number within a closed interval from zero to the minimum value as the layer number that is of the candidate vertex and that belongs to a same group as a partition number of the neighboring partition.

7. The method according to claim 5, wherein vertex-cut partitioning is performed on the multiple vertices in the graph data whole set; a partition border comprises a vertex; and a shortest distance between the vertex on the partition border and the partition border of a partition in which the vertex is located is zero; and wherein the query condition indicates a maximum distance between the candidate vertex and the query vertex;

when the maximum distance is not greater than the layer number of the query vertex, determining the partition number and the layer number of the candidate vertex comprises:

determining that the partition number of the candidate vertex is the partition number of the query vertex;

determining a minimum value between a maximum layer number in a partition in which the query vertex is located and a value obtained by adding the layer number of the query vertex and the maximum distance; and determining a layer number within a closed interval from a value obtained by subtracting the maximum distance from the layer number of the query vertex to the minimum value as the layer number of the candidate vertex;

when the maximum distance is greater than the layer number of the query vertex, the determining a partition number and a layer number of the candidate vertex specifically comprises:

determining that the partition number of the candidate vertex is the partition number of the query vertex and a partition number of a neighboring partition of a partition in which the query vertex is located;

for the partition in which the query vertex is located, determining a minimum value between a maximum layer number in the partition in which the query vertex is located and a value obtained by adding the layer number of the query vertex and the maximum distance, and determining a layer number within a closed interval from zero to the minimum value as the layer number that is of the candidate vertex and that belongs to a same group as the partition number of the query vertex; and for each neighboring partition of the partition in which the query vertex is located, determining a minimum value between a maximum layer number of the neighboring partition and a value obtained by subtracting the layer number of the query vertex from the maximum distance, and determining a layer number within a closed interval from zero to the minimum value as the layer number that is of the candidate vertex and that belongs to a same group as a partition number of the neighboring partition.

8. The method according to claim 1, wherein acquiring the query condition, and the partition number and the layer number of the query vertex indicated by the query condition comprises:

acquiring the query condition; and when the query condition indicates that a shortest path between a first query vertex and a second query vertex needs to be queried, acquiring a partition number and a layer number of the first query vertex and a partition number and a layer number of the second query vertex; and when the first query vertex and the second query vertex are located in a same partition, determining the partition number and a layer number of a candidate vertex indicated by the query condition comprises:

determining that the partition number of the candidate vertex is the partition number of the first query vertex and the second query vertex; and determining a layer number within a closed interval from the layer number of the first query vertex to the layer number of the second query vertex as the layer number of the candidate vertex;

when the first query vertex and the second query vertex are located in different partitions, determining the partition number and the layer number of the candidate vertex indicated by the query condition comprises:

determining that the partition number of the candidate vertex is the partition number of the first query vertex and the partition number of the second query vertex;

for a partition in which the first query vertex is located, determining a layer number within a closed interval from zero to the layer number of the first query vertex as the layer number that is of the candidate vertex and that belongs to a same group as the partition number of the first query vertex; and for a partition in which the second query vertex is located, determining a layer number within a closed interval from zero to the layer number of the second query vertex as the layer number that is of the candidate vertex and that belongs to a same group as the partition number of the second query vertex.

9. The method according to claim 8, further comprising:

extending a layer number interval comprised in the candidate set to obtain an extended candidate set when required graph data fails to be found in the candidate set according to the query condition; and performing graph data query in the extended candidate set according to the query condition.

10. The method according to claim 1, wherein when the graph data in the graph data whole set is stored in a file system, partition numbers and layer numbers of the multiple vertices are stored in one file, graph data of vertices that have a same partition number and layer number are stored in one file, and graph data of vertices that have different partition numbers and layer numbers are stored in different files.

11. A device, applied to query of graph data in a graph data whole set, wherein the graph data whole set comprises multiple vertices and an edge between every two vertices that have a connection relationship; partitioning and layering are performed on the multiple vertices in the graph data whole set; a number of a partition in which a vertex is located is used as a partition number of the vertex; a shortest distance between a vertex and a partition border of a partition in which the vertex is located is used as a layer number of the vertex; the device comprising:
a memory configured to store instructions; and
a processor coupled to the memory and configured to execute the instructions to:
acquire a query condition, and a partition number and a layer number of a query vertex indicated by the query condition;
determine, based on the partition number and the layer number of the query vertex, a partition number and a layer number of a candidate vertex indicated by the query condition, and use the partition number and the layer number of the candidate vertex respectively as a candidate partition number and a candidate layer number, wherein the candidate vertex is a vertex that needs to be queried according to the query condition;
form a candidate set using a vertex whose partition number and layer number satisfy any group of a candidate partition number and a candidate layer number; and
perform graph data query in the candidate set according to the query condition.

12. The device according to claim 11, wherein a layer number of a vertex incapable of reaching a partition border of a partition in which the vertex is located is a default layer number, and the default layer number is different from a layer number of a vertex capable of reaching a partition border of a partition in which the vertex is located; and
when the layer number of the query vertex is the default layer number, when forming the candidate set using the vertex whose partition number and layer number satisfy any group of the candidate partition number and the candidate layer number, the processor is configured to execute the instructions to:
form a candidate set using a vertex whose partition number is the partition number of the query vertex and whose layer number is the default layer number.

13. The device according to claim 11, wherein for the edge between every two vertices that have a connection relationship, when all of the edges have a same weight, a shortest distance between a vertex and a partition border of a partition in which the vertex is located is a smallest hop count between the vertex and the partition border of the partition in which the vertex is located, and a distance between two vertices is a hop count between one vertex of the two vertices and the other vertex.

14. The device according to claim 11, wherein for the edge between every two vertices that have a connection relationship, when not all of the edges have a same weight, a minimum length in lengths of paths between a vertex and a partition border of a partition in which the vertex is located is used as a shortest distance between the vertex and the partition border of the partition in which the vertex is located, and a distance between two vertices is a length of a path between one vertex of the two vertices and the other vertex, wherein a length of a path is the sum of weights of edges comprised in the path.

15. The device according to claim 11, when determining the partition number and the layer number of the candidate vertex indicated by the query condition, the processor is configured to execute the instructions to:
determine, based on the partition number and the layer number of the query vertex and according to a distance between the candidate vertex indicated by the query condition and the query vertex, the partition number and the layer number of the candidate vertex.

16. The device according to claim 15, wherein edge-cut partitioning is performed on the multiple vertices in the graph data whole set; a partition border comprises no vertex; and a shortest distance between a vertex that has an edge crossing another partition and a partition border of a partition in which the vertex is located is zero; and
wherein the query condition indicates a maximum distance between the candidate vertex and the query vertex;
if the maximum distance is not greater than the layer number of the query vertex, when determining the partition number and the layer number of the candidate vertex, the processor is configured to execute the instructions to:
determine that the partition number of the candidate vertex is the partition number of the query vertex;
determine a minimum value between a maximum layer number in a partition in which the query vertex is located and a value obtained by adding the layer number of the query vertex and the maximum distance; and
determine a layer number within a closed interval from a value obtained by subtracting the maximum distance from the layer number of the query vertex to the minimum value as the layer number of the candidate vertex;
if the maximum distance is greater than the layer number of the query vertex, when determining the partition number and the layer number of the candidate vertex, the processor is configured to execute the instructions to:
determine that the partition number of the candidate vertex is the partition number of the query vertex and a partition number of a neighboring partition of a partition in which the query vertex is located;
for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and
for each neighboring partition of the partition in which the query vertex is located, determine a minimum value between a maximum layer number of the neighboring partition and a value obtained by subtracting the layer number of the query vertex and then subtracting 1 from the maximum distance, and determine a layer number within a closed interval from zero to the minimum value as the layer number that is of the candidate vertex and that belongs to a same group as a partition number of the neighboring partition.

17. The device according to claim 15, wherein vertex-cut partitioning is performed on the multiple vertices in the graph data whole set; a partition border comprises a vertex; and a shortest distance between the vertex on the partition border and the partition border of a partition in which the vertex is located is zero; and wherein the query condition indicates a maximum distance between the candidate vertex and the query vertex;

if the maximum distance is not greater than the layer number of the query vertex, when determining the partition number and the layer number of the candidate vertex, the processor is configured to execute the instructions to:

determine that the partition number of the candidate vertex is the partition number of the query vertex;

determine a minimum value between a maximum layer number in a partition in which the query vertex is located and a value obtained by adding the layer number of the query vertex and the maximum distance; and determine a layer number within a closed interval from a value obtained by subtracting the maximum distance from the layer number of the query vertex to the minimum value as the layer number of the candidate vertex;

if the maximum distance is greater than the layer number of the query vertex, when determining the partition number and the layer number of the candidate vertex, the processor is configured to execute the instructions to:

determine that the partition number of the candidate vertex is the partition number of the query vertex and a partition number of a neighboring partition of a partition in which the query vertex is located;

for the partition in which the query vertex is located, determine a minimum value between a maximum layer number in the partition in which the query vertex is located and a value obtained by adding the layer number of the query vertex and the maximum distance, and determine a layer number within a closed interval from zero to the minimum value as the layer number that is of the candidate vertex and that belongs to a same group as the partition number of the query vertex; and for each neighboring partition of the partition in which the query vertex is located, determine a minimum value between a maximum layer number of the neighboring partition and a value obtained by subtracting the layer number of the query vertex from the maximum distance, and determine a layer number within a closed interval from zero to the minimum value as the layer number that is of the candidate vertex and that belongs to a same group as a partition number of the neighboring partition.

18. The device according to claim 11, when acquiring the query condition, and the partition number and the layer number of the query vertex indicated by the query condition, the processor is configured to execute the instructions to:

acquire the query condition; and when the query condition indicates that a shortest path between a first query vertex and a second query vertex needs to be queried, acquire a partition number and a layer number of the first query vertex and a partition number and a layer number of the second query vertex; and if the first query vertex and the second query vertex are located in a same partition, when determining the partition number and the layer number of the candidate vertex indicated by the query condition, the processor is configured to execute the instructions to:

determine that the partition number of the candidate vertex is the partition number of the first query vertex and the second query vertex; and determine a layer number within a closed interval from the layer number of the first query vertex to the layer number of the second query vertex as the layer number of the candidate vertex;

if the first query vertex and the second query vertex are located in different partitions, when determining the partition number and a layer number of a candidate vertex indicated by the query condition, the processor is configured to execute the instructions to:

determine that the partition number of the candidate vertex is the partition number of the first query vertex and the partition number of the second query vertex;

for a partition in which the first query vertex is located, determine a layer number within a closed interval from zero to the layer number of the first query vertex as the layer number that is of the candidate vertex and that belongs to a same group as the partition number of the first query vertex; and for a partition in which the second query vertex is located, determine a layer number within a closed interval from zero to the layer number of the second query vertex as the layer number that is of the candidate vertex and that belongs to a same group as the partition number of the second query vertex.

19. The device according to claim 18, wherein the processor is further configured to execute the instructions to:

extend a layer number interval comprised in the candidate set to obtain an extended candidate set when required graph data fails to be found in the candidate set according to the query condition; and perform graph data query in the extended candidate set according to the query condition.

20. The device according to claim 11, wherein when the graph data in the graph data whole set is stored in a file system, partition numbers and layer numbers of the multiple vertices are stored in one file, graph data of vertices that have a same partition number and layer number are stored in one file, and graph data of vertices that have different partition numbers and layer numbers are stored in different files.

* * * * *